United States Patent

Masuda et al.

(10) Patent No.: US 9,080,053 B2
(45) Date of Patent: Jul. 14, 2015

(54) LAMINATED FILM AND MOLDED BODY

(75) Inventors: Yoshihiro Masuda, Shiga (JP); Syunichi Osada, Shiga (JP); Kazumori Sonoda, Shiga (JP); Takashi Mimura, Shiga (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/116,872

(22) PCT Filed: May 10, 2012

(86) PCT No.: PCT/JP2012/061942
§ 371 (c)(1),
(2), (4) Date: Dec. 23, 2013

(87) PCT Pub. No.: WO2012/157500
PCT Pub. Date: Nov. 22, 2012

(65) Prior Publication Data
US 2014/0171598 A1 Jun. 19, 2014

(30) Foreign Application Priority Data

May 16, 2011 (JP) ................................. 2011-109093
Dec. 12, 2011 (JP) ................................. 2011-270982

(51) Int. Cl.
| C08G 18/61 | (2006.01) |
| C08J 7/04 | (2006.01) |
| C08F 290/06 | (2006.01) |
| C08G 18/42 | (2006.01) |
| B32B 27/36 | (2006.01) |
| B32B 27/00 | (2006.01) |
| C08L 75/06 | (2006.01) |
| C08G 18/40 | (2006.01) |
| B32B 27/40 | (2006.01) |
| C08G 18/62 | (2006.01) |
| C08G 18/78 | (2006.01) |
| C08G 18/79 | (2006.01) |
| C08L 83/04 | (2006.01) |

(52) U.S. Cl.
CPC ................. *C08L 75/06* (2013.01); *B32B 27/00* (2013.01); *B32B 27/40* (2013.01); *C08G 18/4063* (2013.01); *C08G 18/4277* (2013.01); *C08G 18/6295* (2013.01); *C08G 18/7831* (2013.01); *C08G 18/792* (2013.01); *C08J 7/047* (2013.01); *C08L 83/04* (2013.01); *C08J 2375/04* (2013.01); *C08J 2483/04* (2013.01)

(58) Field of Classification Search
CPC ......... C08L 75/06; C08L 83/04; C08L 83/06; C08L 83/12; C08G 18/06; C08G 18/28; C08G 18/2885; C08G 18/5015
USPC ....................................................... 525/381
See application file for complete search history.

(56) References Cited

FOREIGN PATENT DOCUMENTS

| JP | 7-117202 | 5/1995 |
| JP | 2004-35599 | 2/2004 |
| JP | 2006-137780 | 6/2006 |
| JP | 2007-56268 | 3/2007 |
| JP | 2009-84395 | 4/2009 |
| WO | 2007/069765 A1 | 6/2007 |
| WO | 2011-136042 A1 | 11/2011 |

OTHER PUBLICATIONS

Wouters, et al. "Surface Rearrangement of Tailored Polyurethane-Based Coatings", Journal of Coating Technology, 1 (6) Apr. 2005, pp. 435-443.*
Hawley's Chemcial Dictionary Definition of Film, Mar. 2007.*
Zia, et al. "Surface characteristics of UV-irradiated chitin based shape memory polyurethanes" Carbohydrate Polymers, 80, Mar. 2010, p. 229-234.*
Zia et al. "Surface characteristics of polyurethane elastomers based on chitin/1,4-butane diol blends", International Journal of Biological Macromolecules, 44 (2), Mar. 2009, pp. 182-185.*
JP2006-137780 English Machine Translation created Dec. 2014.*

* cited by examiner

*Primary Examiner* — Randy Gulakowski
*Assistant Examiner* — Christopher M Rodd
(74) *Attorney, Agent, or Firm* — DLA Piper LLP (US)

(57) ABSTRACT

A laminated film includes a substrate film and layer A provided at least on one side thereof, layer A containing (1) a (poly)caprolactone segment and (2) a urethane bond, wherein a distilled water contact angle on layer A and a diiodomethane contact angle on layer A are 95° or more, but less than 120° and 70° or more, but less than 87°, respectively.

12 Claims, No Drawings

LAMINATED FILM AND MOLDED BODY

TECHNICAL FIELD

This disclosure relates to laminated films. More specifically, the disclosure relates to laminated films that are, as forming materials, excellent in terms of forming conformability and scratch resistance and advantageous in terms of productivity and cost.

BACKGROUND

Forming materials such as decorative forming materials, are provided with a hardened surface layer to prevent scratching during forming and during use as formed products. However, since a hardened surface layer has inadequate elasticity to conform to a mold or forming action, it develops cracks during forming. In extreme cases, the film snaps and the hardened surface layer peels off. For this reason, techniques such as the formation of a hardened surface layer after a forming operation and forming in a semi-cured state, followed by complete curing through heating or irradiation with an energy ray have been adopted.

Since formed products have been three-dimensionally processed, it is very difficult to provide a hardened surface layer through post-forming processing. Moreover, forming in a semi-cured state sometimes induces soiling of the mold depending on forming conditions. For these reasons, the focus of attention has, in recent years, been shifting from scratch resistance based on increased hardness to "self-healing materials" designed to repair themselves of minor scratches as anti-scratching materials conforming to the mold or forming action. Self-healing materials are capable of repairing themselves of deformations within their respective elastic recovery ranges (a property known as "self-healing property") and, roughly speaking, two-types of curing, thermal curing and energy ray curing based on ultraviolet light and electron beams, are known. Japanese Unexamined Patent Publication (Kokai) No. 2009-84395 describes an energy ray curing material with a high surface hardness. Japanese Unexamined Patent Publication (Kokai) No. 2004-35599, and Japanese Unexamined Patent Publication (Kokai) No. 2006-137780 describe self-curable energy ray curing materials. International Publication WO 2011/136042, on the other hand, describes a self-curable thermally curing material.

However, the energy ray curing material described in Japanese Unexamined Patent Publication (Kokai) No. 2009-84395, has a problem in that it has no self-healing property despite having a high surface hardness and that it is unsuitable in forming applications with large forming ratios due to low elasticity.

Although the energy ray curing materials described in Japanese Unexamined Patent Publication (Kokai) No. 2004-35599 and Japanese Unexamined Patent Publication (Kokai) No. 2006-137780 and the thermally curing material described in International Publication WO 2011/136042, have adequate self-healing property, they are inadequate in terms of soiling resistance, given that they are sometimes soiled with PVC sheet-derived dioctyl phthalate, cosmetics, oil-based marker pens, and the like.

It could therefore be helpful to provide a laminated film having a self-healing layer that is excellent in forming conformability as well as self-healing property and soiling resistance.

SUMMARY

We thus provide laminated films comprising a substrate film and layer A provided at least on one side thereof, which is characterized by the fact that layer A contains (1) a (poly) caprolactone segment and (2) a urethane bond, and that the distilled water contact angle on layer A and the diiodomethane contact angle on layer A are 95° or more but less than 120° and 70° or more but less than 87°, respectively.

The laminated films exhibit excellent forming conformability during a thermal forming process and have a surface scratch repairing function (self-healing property), as well as excellent soiling resistance. The laminated films are particularly effective for use as a resin film exposed to a high surface scratch risk.

DETAILED DESCRIPTION

Our films, molded bodies and methods will now be described in more detail.

<Substrate Film>

The resin constituting the substrate film may be either a thermoplastic resin or thermosetting resin and can be a homogeneous resin, copolymer or a blend of two or more resins. Preferably, however, the resin constituting the substrate film is a thermoplastic resin because of its good formability.

Examples of a thermoplastic resin available for use include polyolefin resins such as polyethylene, polypropylene, polystyrene and polymethylpentene; polyamide resins such as alicyclic polyolefin resin, nylon 6 and nylon 66; aramid resins; polyester resins; polycarbonate resins; polyallylate resins; polyacetal resins; polyphenylene sulfide resins; fluororesins such as ethylene tetrafluoride resin, ethylene trifluoride resin, ethylene trifluoride chloride resin, ethylene tetrafluoride-propylene hexafluoride copolymer and vinylidene fluoride resin; acrylic resins; methacryl resins; polyacetal resins; polyglycolic acid resins; and polylactic acid resins. Of these, thermoplastic resins with adequate stretchability and conformability are preferable, particularly polyester resins from the viewpoint of strength, heat resistance, and transparency.

Polyester resins encompass all polymers containing ester bonds as main chain bonds in the backbone chain, and are obtained through a condensation polymerization of an acid component, and/or an ester thereof, and a diol component. Specific examples include polyethylene terephthalate, polypropylene terephthalate, polyethylene-2,6-naphthalate, and polybutylene terephthalate. They may also be copolymerized with other dicarboxylic acids, and/or esters thereof, and diols. Of these, polyethylene terephthalate and polyethylene-2,6-naphthalate are particularly preferable in terms of dimensional stability, heat resistance, and so on.

The substrate film may contain various additives including for instance, an antioxidant, antistatic agent, crystal nucleating agent, inorganic particles, organic particles, viscosity reducing agent, thermal stabilizer, lubricant, infrared absorber, ultraviolet absorber, and a doping agent to adjust the refractive index.

The substrate film may either have a single-layer structure or a laminated structure.

<Polyester Substrate Film>

A substrate film is referred to as a polyester substrate film if the constituent resin thereof contains a polyester resin by 50 to 100 mass % with regard to the combined 100 mass % of all components.

It is preferable that the polyester resin constituting a polyester substrate film have a polyester limiting viscosity (as measured in 25° C. o-chlorophenol in accordance with JIS K7367(2000)) of 0.4 to 1.2 dl/g, particularly preferably 0.5 to 0.8 dl/g.

Though a polyester substrate film may be an unstretched (non-oriented) film, uniaxially stretched (uniaxially oriented) film or a biaxial stretched (biaxially oriented) film, it is preferable that biaxial stretched film be used because of its excellent dimensional stability and heat resistance. It is preferable that the biaxial stretched film have a highly oriented crystalline structure. Biaxial orientation means a biaxially oriented pattern as exhibited in wide-angle X-ray diffraction.

The polyester substrate film may be a polyester film with fine internal cavities.

The polyester substrate film may have a single-layer structure or a laminated structure.

When the polyester substrate film has a laminated structure, it is a laminate of layers constituted of different polyester resins, preferably, a layer containing 50 to 100 mass % of polyester resin C (layer C) and another containing 50 to 100 mass % of polyester resin D (layer D). Different polyester resins used in a polyester substrate film with a laminated structure may mean either polyester resins with different molecular structures or copolymerized polyester resins containing one or more different components.

It is more preferable that, when the polyester substrate film has a laminated structure, it be a laminate of a layer containing 50 to 100 mass % of polyester resin C (layer C) and another containing 50 to 100 mass % of polyester resin D (layer D), which is dissimilar to polyester resin C. It is more preferable that such a polyester substrate film have 50 or more layers consisting of two types of layers, one containing 50 to 100 mass % of polyester resin C (layer C) and another containing 50 to 100 mass % of polyester resin D (layer D), laminated alternately. It is even more preferable that the number of laminated layers be 200 or more. The upper limit to the number of laminated layers is preferably 1500, taking into consideration that an increase in the number of laminated layers leads to an oversizing of equipment and a reduction in wavelength selectivity, which is attributable to a fall in lamination precision as a byproduct of too many layers. It is preferable that a polyester substrate film with a multi-layer laminated structure be adopted as it has metallic color.

It is preferable that polyester resin C be polyethylene terephthalate or polyethylene naphthalate and that polyester resin D be a polyester containing a spiroglycol. A polyester containing a spiroglycol means a copolyester containing a spiroglycol as a copolymerization component (a polyester containing a spiroglycol as part of its glycol component), homopolyester (a homopolyester whose glycol component is entirely a spiroglycol), or a blended polyester of those two. A polyester containing a spiroglycol is preferable as its difference in glass transition temperature from polyethylene terephthalate and polyethylene naphthalate is small, making it less prone to overstretching during forming and relatively immune to delamination.

It is more preferable that polyester resin C be polyethylene terephthalate or polyethylene naphthalate and that polyester resin D be a polyester containing a spiroglycol and cyclohexanedicarboxylic acid. A polyester containing a spiroglycol and cyclohexanedicarboxylic acid means a copolyester containing a spiroglycol and cyclohexanedicarboxylic acid (or an ester derivative of a cyclohexanedicarboxylic acid) as copolymerization components, homopolyester (a homopolyester whose glycol component is entirely a spiroglycol and whose carboxylic acid component is entirely an cyclohexanedicarboxylic acid), or a blended polyester of those two. If polyester resin D is a polyester containing a spiroglycol and cyclohexanedicarboxylic acid, its difference in in-plane refractive index from polyethylene terephthalate and polyethylene naphthalate is large, making it easier to obtain a high reflectance. Moreover, its difference in glass transition temperature from polyethylene terephthalate and polyethylene naphthalate is small, making it less prone to overstretch during forming and relatively immune to delamination.

It is preferable that polyester resin C be polyethylene terephthalate or polyethylene naphthalate and that polyester resin D be a polyester containing cyclohexanedimethanol. A polyester containing cyclohexanedimethanol is a copolyester containing cyclohexanedimethanol as a copolymerization component, homopolyester (a homopolyester whose glycol component is entirely cyclohexanedimethanol), or a blended polyester of those two. A polyester containing cyclohexanedimethanol is preferable as its difference in glass transition temperature from polyethylene terephthalate and polyethylene naphthalate is small, making it less prone to overstretch during forming and relatively immune to delamination.

Polyester resin D is more preferably an ethylene terephthalate polycondensate containing 15 to 60 mol % of cyclohexanedimethanol as a copolymerization component. If polyester resin D is an ethylene terephthalate polycondensate containing 15 to 60 mol % of cyclohexanedimethanol as a copolymerization component, it possesses a high reflective performance, exhibits only a small change in optical characteristics as a result, in particular, of heating or aging, and is relatively immune to delamination. An ethylene terephthalate polycondensate containing 15 to 60 mol % of cyclohexanedimethanol as a copolymerization component exhibits a very high compatibility with polyethylene terephthalate. Moreover, since its cyclohexanedimethanol group has cis and trans isomers as geometric isomers and chair and boat conformers as conformational isomers, it tends not to undergo oriented crystallization, if co-stretched with polyethylene terephthalate, exhibits a high reflectance, with only a small heat history-related change in optical characteristics, and is tear-resistant during film production.

It is preferable that the in-plane average refractive index of layer C is higher than the in-plane average refractive index of layer D. It is also preferable that the difference between the in-plane average refractive index of layer C and the in-plane average refractive index of layer D be 0.01 or more and that the thickness of one layer be 0.03 µm or more but 0.5 µm or less. More preferably, the difference between the in-plane average refractive index of layer C and the in-plane average refractive index of layer D is 0.05 or more, even more preferably 0.1 or more. If the difference between the in-plane average refractive index of layer C and the in-plane average refractive index of layer D is 0.01 or more, the film displays an excellent metallic color as a result of interference reflection. In addition, it is more preferable that the difference between the in-plane average refractive index of layer C and its thickness-direction refractive index be 0.01 or more and that the difference between the in-plane average refractive index of layer D and its thickness-direction refractive index difference be 0.01 or less, as this prevents a reduction in reflectance in the reflective wavelength range even if the incidence angle becomes large.

It is preferable that the difference in glass transition temperature between polyester resin C and polyester resin D be 20° C. or less. If the difference in glass transition temperature between polyester resin C and polyester resin D is 20° C. or less, film production by lamination of layer C and layer D leads to a polyester substrate film with a uniform thickness, while the preparation of a laminated film from such a substrate film is free of cracking or delamination.

<Laminated Film Having Layer A>

A laminated film comprising a substrate film and layer A, provided on at least on one side thereof, will now be described below.

The laminated films comprise a substrate film and layer A, provided on at least on one side thereof, wherein layer A has (1) a (poly)caprolactone segment and (2) a urethane bond and wherein the distilled water contact angle on layer A and the diiodomethane contact angle on layer A are 95° or more but less than 120° and 70° or more but less than 87°, respectively.

The laminated films have excellent self-healing and soiling resistance effects as a result of having layer A at least on one side of the substrate film.

While layer A may be provided on both sides of the substrate film, it is preferable that, taking cost into consideration, layer A be present only on one side of the substrate film, though it depends on the application. In many applications, it suffices for layer A to be present only on one side of the substrate film to provide the laminated film with adequate self-healing property and soiling resistance.

Components contained in layer A will now be described below.

<(Poly)Caprolactone Segment>

Layer A has (1) a (poly)caprolactone segment. A (poly)caprolactone segment can provide layer A with elastic recoverability (self-healing property).

A (poly)caprolactone segment refers to a segment represented by formula (1) below

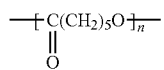

(1)

n is an integer between 1 and 35.

Layer A can be provided with a (poly)caprolactone segment by forming it from a composition containing a resin that contains a (poly)caprolactone segment. It is preferable that a resin that contains a (poly)caprolactone segment have at least one hydroxyl group. It is preferable that a hydroxyl group be present at the terminus of the resin that contains a (poly)caprolactone segment.

By having a component containing a (poly)caprolactone segment, layer A acquires self-healing property. This enables layer A to erase a scratch inflicted on its surface within just a few short seconds (self healing).

It is preferable that a resin that contains a (poly)caprolactone segment be a (poly)caprolactone having a di- or trifunctional hydroxyl groups, more specifically: a (poly)caprolactone diol,

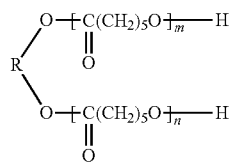

(2)

m is an integer between 1 and 34; n is an integer between 1 and 34; and m+n is an integer between 4 and 35;

R: —C$_2$H$_4$—, —C$_2$H$_4$OC$_2$H$_4$—, —C(CH$_3$)$_2$(CH$_2$)$_2$—

(Poly)caprolactonetriol,

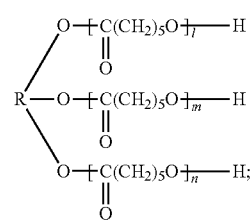

(3)

l is an integer between 1 and 28; m is an integer between 1 and 28; n is an integer between 1 and 28; and l+m+n is an integer between 3 and 30;

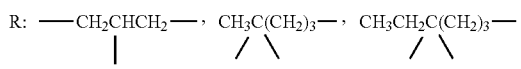

Lactone-modified hydroxyethyl(metha-)acrylate

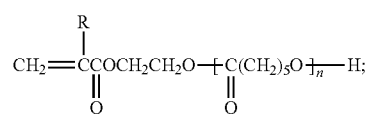

(4)

R: H or CH$_3$; and n is an integer between 1 and 25;
or some other radically polymerized caprolactone may be used.

The resin that contains a (poly)caprolactone segment may, in addition to a (poly)caprolactone segment, also contain (or be copolymerized with) other segments or monomers. Examples include a polydimethyl siloxane segment and polysiloxane segment.

It is preferable that the weight-average molecular weight of the (poly)caprolactone segment in the resin that contains a (poly)caprolactone segment be 500 to 2500, more preferably 1000 to 1500. If the weight-average molecular weight of the (poly)caprolactone segment is 500 to 2500, the self-healing effect manifests more strongly, while scratch resistance improves.

Whether a (poly)caprolactone segment is copolymerized with or added separately, it is preferable that the amount of the (poly)caprolactone segment be 5 to 70 mass % with regard to the combined 100 mass % of all components of the composition used to form layer A from the viewpoint of self-healing property and soiling resistance. The combined 100 mass % of all components of the composition does not include solvents that do not take part in the reaction. Any monomer components that do take part in the reaction are included.

<Urethane Bond>

Layer A has (2) a urethane bond.

Letting the composition used to form layer A contain a urethane-modified resin enables layer A to have a urethane bond. Producing a urethane bond by letting an isocyanate group and hydroxyl group react when forming layer A also enables layer A to have a urethane bond.

Layer A is preferably provided with a urethane bond by letting an isocyanate group and hydroxyl group react to produce a urethane bond. Letting an isocyanate group and hydroxyl group react to produce a urethane bond makes it possible to improve the toughness of layer A, as well as its elastic recoverability (self-healing property).

Moreover, if a resin containing a polysiloxane segment or another containing a polydimethyl siloxane segment has a hydroxyl group, it is possible to make such a resin and a compound having an isocyanate group produce a urethane bond by heating, etc. It is preferable that layer A be formed using a compound having an isocyanate group and a resin that contains a polysiloxane segment having a hydroxyl group resin that contains a polydimethyl siloxane segment having a hydroxyl group, as this can further enhance the toughness and elastic recoverability (self-healing property) of layer A.

A compound containing an isocyanate group refers to a resin containing an isocyanate group, a monomer or oligomer containing an isocyanate group, or the like. Examples of a compound containing an isocyanate group include a trimethylolpropane adduct of methylene bis-4-cyclohexyl isocyanate and tolylene diisocyanate, a trimethylolpropane adduct of hexamethylene diisocyanate, a trimethylolpropane adduct of isophorone diisocyanate, an isocyanurate of tolylene diisocyanate, an isocyanurate of hexamethylene diisocyanate, a biuret of hexamethylene isocyanate, and other polyisocyanates, as well as blocked compounds of the above isocyanates.

Of these isocyanate group-containing compounds, aliphatic isocyanates, as opposed to alicyclic or aromatic isocyanates, are preferable because of their high self-healing property. It is more preferable that the compound containing an isocyanate group be hexamethylene diisocyanate. Moreover, isocyanates having an isocyanurate ring are particular preferable as compounds containing an isocyanate group in terms of heat resistance, with isocyanurates of hexamethylene diisocyanate most preferable. An isocyanate having an isocyanurate ring gives rise to layer A that combines self-healing property and heat resistant characteristics.

It is preferable that the layer A be formed through a urethane bond-generating thermal reaction involving an isocyanate group and hydroxyl group. In this regard, a compound containing a bi- or higher functional isocyanate group is preferable as it improves physical properties by coupling with compounds with a hydroxyl group more extensively.

When forming layer A, it is preferable that 11 to 40 mass % of a compound containing an isocyanate group be contained with regard to the combined 100 mass % of all components of the composition used to form layer A. However the combined 100 mass % of all components of the composition used to form layer A does not include solvents that do not take part in the reaction. Any monomer components that do take part in the reaction are included.

The composition used to form layer A is allowed to contain a crosslinking agent such as alkoxy methylol melamine or some other melamine-based crosslinking agent, 3-methylhexahydro phthalic anhydride or some other anhydride-based crosslinking agent, or diethyl aminopropyl amine or some other amine-based crosslinking agent. To promote the urethane bond formation reaction, a crosslinking catalyst, such as dibutyltin dilaurate, or dibutyltin diethylhexanoate may also be used as needed.

The layer A preferably contains a resin that has all of (1) a (poly)caprolactone segment, (2) a urethane bond and (3) a polysiloxane segment and/or polydimethyl siloxane segment. If all of (1) a (poly)caprolactone segment, (2) a urethane bond and (3) a polysiloxane segment and/or polydimethyl siloxane segment are contained in a resin as a polymer, as preferred, layer A becomes tougher.

It is possible to obtain a layer A containing all of a (poly) caprolactone segment, polydimethyl siloxane segment and urethane bond by coating a substrate film with a composition containing at least the three components of a polydimethyl siloxane copolymer having a hydroxyl group, (poly)caprolactone and a compound containing an isocyanate group and letting it undergo a reaction by heating.

It is more preferable that a resin having all of (1) a (poly) caprolactone segment, (2) a urethane bond and (3) a (poly) siloxane segment and/or (poly)dimethyl siloxane segment account for 80 to 100 mass % of the combined 100 mass % of all components constituting layer A. If a resin having all of (1) a (poly)caprolactone segment, (2) a urethane bond and (3) a (poly) siloxane segment and/or (poly)dimethyl siloxane segment accounts for 80 to 100 mass % of the combined 100 mass % of all components constituting layer A, self-healing property is enhanced.

<Polysiloxane Segment>

It is preferable that layer A have (3) a polysiloxane segment. A polysiloxane segment refers to a segment represented by the chemical formula below. Meanwhile, in formula (5), R is either OH or an alkyl group with a carbon number of 1 to 8, and the formula contains at least one of each.

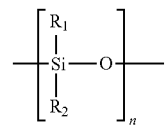

(5)

$R_1$, $R_2$: OH or an alkyl group with a carbon number of 1 to 8; n is an integer between 3 and 100; and
$R_1$ and $R_2$ may be identical or different.

For layer A to have a polysiloxane segment, the composition used to form layer A needs to contain a resin that contains a polysiloxane segment.

A partial hydrolysate of asilane compound containing a hydrolysable silyl group, an organosilica sol or a composition in which a hydrolysable silane compound having a radical polymerization product has been added to an organosilica sol may be used as a resin containing a polysiloxane segment.

Examples of a resin containing a polysiloxane segment include a complete or partial hydrolysate of a silane compound having a hydrolysable silyl group such as tetraalkoxysilane, methyl trialkoxysilane, dimethyl dialkoxysilane, γ-glycidoxy propyl trialkoxysilane, γ-glycidoxy propyl alkyl dialkoxysilane, γ-methacryloyloxy propyl trialkoxysilane or γ-methacryloyloxy propyl alkyl dialkoxysilane, an organosilica sol in which a silane compound having a hydrolysable silyl group has been dispersed in an organic solvent, and an organosilica sol to whose surface a hydrolyzed silane compound has been added.

A resin containing a polysiloxane segment may contain (or be copolymerized with) segments and the like other than a polysiloxane segment. Examples include a monomer component containing a (poly)caprolactone segment or polydimethyl siloxane segment.

It is preferable that a resin containing a polysiloxane segment be copolymerized with, among other things, a monomer having a hydroxyl group that reacts with an isocyanate group. If a resin containing a polysiloxane segment is copolymerized with, among other things, a monomer having a hydroxyl group that reacts with an isocyanate group, the toughness of layer A is improved.

If a resin containing a polysiloxane segment is a copolymer having a hydroxyl group, the use of a composition containing a resin that contains a polysiloxane segment (copolymer) having a hydroxyl group and a compound that contains an isocyanate group provides an efficient way of forming a layer A having a polysiloxane segment and a urethane bond.

Whether a polysiloxane segment is copolymerized with or added separately, it is preferable that the amount of the polysiloxane segment be 1 to 20 mass % with regard to the combined 100 mass % of all components of the composition used to form layer A from the viewpoint of self-healing property, soiling resistance, weather resistance and heat resistance. The combined 100 mass % of all components of the composition used to form layer A does not include solvents that do not take part in the reaction. Any monomer components that do take part in the reaction are included.

<Polydimethyl Siloxane Segment>

It is preferable that layer A have (3) a polydimethyl siloxane segment.

A polydimethyl siloxane segment refers to a segment represented by the formula (6) below.

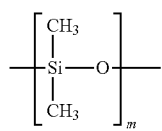
(6)

$m$ is an integer between 10 and 300.

When layer A has a polydimethyl siloxane segment, the polydimethyl siloxane segment is present on the surface of layer A. The presence of a polydimethyl siloxane segment on the surface of layer A improves the lubricity of the surface of layer A, thus reducing friction resistance. Scratchability can be limited as a result.

For layer A to have a polydimethyl siloxane segment, the composition used to form layer A needs to contain a resin containing a polydimethyl siloxane segment. It is preferable that a copolymer in which a vinyl monomer has been copolymerized into a polydimethyl siloxane segment be used as a resin containing a polydimethyl siloxane segment.

To improve the toughness of layer A, it is preferable that a resin containing a polydimethyl siloxane segment be copolymerized with, among other things, a monomer having a hydroxyl group that reacts with an isocyanate group. If a resin containing a polydimethyl siloxane segment is a copolymer having a hydroxyl group, the use of a composition containing a resin that contains a polydimethyl siloxane segment (copolymer) having a hydroxyl group and a compound that contains an isocyanate group provides an efficient way of forming a layer A having a polydimethyl siloxane segment and a urethane bond.

If a resin containing a polydimethyl siloxane segment is a copolymer with a vinyl monomer, it may be either a block copolymer, graft copolymer, or random copolymer. If a resin containing a polydimethyl siloxane segment is a copolymer with a vinyl monomer, it is called a polydimethyl siloxane copolymer. Although a polydimethyl siloxane copolymer may be produced using the living polymerization method, polymer initiator method, polymer chain transfer method, or the like, it is preferable that the polymer initiator method or polymer chain transfer method be used in consideration of productivity.

When the polymer initiator method is used, the use of a polymer azo radical polymerization initiator represented by the chemical formula below makes a copolymerization with another vinyl monomer possible.

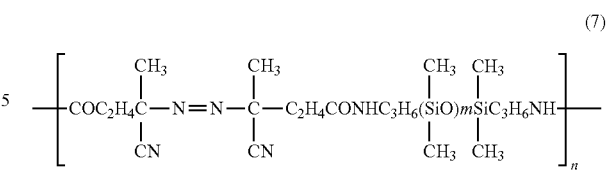
(7)

where $m$ is an integer between 10 and 300 and $n$ is an integer between 1 and 50.

It is also possible to copolymerize a peroxy monomer and polydimethyl siloxane having an unsaturated group at low temperatures to synthesize a prepolymer featuring peroxide groups in its side chains and copolymerize this prepolymer with a vinyl monomer in a two-stage polymerization.

If the polymer chain transfer method is used, for instance, a silicone oil represented by formula (8)

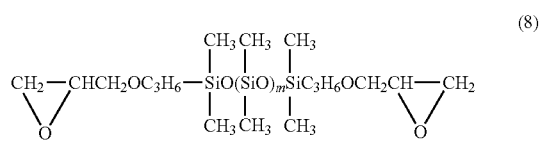
(8)

$m$ is an integer between 10 and 300,
may be turned into a compound having SH groups by adding HS—CH$_2$COOH, HS—CH$_2$CH$_2$COOH, and the like, followed by a copolymerization of this silicone compound and a vinyl monomer based on a chain transfer of SH groups, to synthesize a block copolymer.

To synthesize a polydimethyl siloxane graft copolymer, a copolymerization of a methacryl ester of polydimethyl siloxane, a compound represented by formula (9)

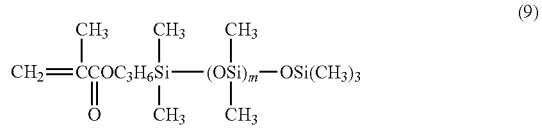
(9)

$m$ is an integer between 10 and 300,
for instance, with a vinyl monomer provides an efficient way of obtaining a graft copolymer.

Examples of a vinyl monomer to be used for the preparation of a copolymer with polydimethyl siloxane include methyl acrylate, ethyl acrylate, n-butyl acrylate, isobutyl acrylate, octyl acrylate, cyclohexyl acrylate, tetrahydrofurfuryl acrylate, methyl methacrylate, ethyl methacrylate, n-butyl methacrylate, isobutyl methacrylate, 2-ethylhexyl methacrylate, stearyl methacrylate, lauryl methacrylate, methyl vinyl ether, ethyl vinyl ether, n-propyl vinyl ether, styrene, α-methyl styrene, acrylonitrile, methacrylonitrile, vinyl acetate, vinyl chloride, vinylidene chloride, vinyl fluoride, vinylidene fluoride, glycidyl acrylate, glycidylmethacrylate, allyl glycidyl ether, acrylic acid, methacrylic acid, itaconate, crotonic acid, maleic acid, maleic anhydride, acrylamide, methacrylamide, N-methylol acrylamide, N,N-dimethyl acrylamide, N,N-dimethylaminoethyl methacrylate, N,N-diethylaminoethyl methacrylate, diacetone acrylamide, 2-hydroxyethyl acrylate, 2-hydroxyethyl methacrylate, 2-hydroxypropyl acrylate, 2-hydroxypropyl methacrylate, and allyl alcohol.

It is preferable that a polydimethyl siloxane copolymer be produced in an aromatic hydrocarbon solvent such as toluene or xylene, a ketone-based solvent such as methyl ethyl ketone or methyl isobutyl ketone, an ester-based solvent such as ethyl acetate or butyl acetate, or an alcohol-based solvent such as ethanol or isopropyl alcohol, or a mixture thereof using the solution polymerization method.

A polymerization initiator, such as benzoyl peroxide or azo bisisobutyl nitrile, may be used as needed. It is preferable that the polymerization reaction take place at 50 to 150° C. over 3 to 12 hours.

It is preferable that the amount of the polydimethyl siloxane segment in the polydimethyl siloxane copolymer be 1 to 30 mass % with regard to the combined 100 mass % of all components of the polydimethyl siloxane copolymer from the viewpoint of lubricity and soiling resistance of layer A. It is also preferable that the weight-average molecular weight of the polydimethyl siloxane segment be 1000 to 30000.

Whether a polydimethyl siloxane segment is copolymerized with or added separately, it is preferable that the amount of dimethyl siloxane segment be 1 to 20 mass % with regard to the combined 100 mass % of all components of the composition used to form layer A from the viewpoint of self-healing property, soiling resistance, weather resistance and heat resistance. The combined 100 mass % of all components of the composition does not include solvents that do not take part in the reaction. Any monomer components that do take part in the reaction are included.

The composition used to form layer A may contain (be copolymerized with) segments and the like other than a polydimethyl siloxane segment if a resin containing a polydimethyl siloxane segment is used. Examples include a (poly)caprolactone segment and polysiloxane segment.

It is possible to use a copolymer of a (poly)caprolactone segment and polydimethyl siloxane segment, a copolymer of a (poly)caprolactone segment and polysiloxane segment or a copolymer of a (poly)caprolactone segment, polydimethyl siloxane segment and polysiloxane segment as the composition used to form layer A. The use of such compositions makes it possible to obtain a layer A having a (poly)caprolactone segment, polydimethyl siloxane segment and/or polysiloxane segment.

The polydimethyl siloxane copolymer, (poly)caprolactone and polysiloxane contained in a composition used to form a layer A having a (poly)caprolactone segment, polysiloxane segment and polydimethyl siloxane segment may be copolymerized by adding a (poly)caprolactone segment and polysiloxane segment as appropriate during the synthesis of a polydimethyl siloxane copolymer.

<Fluorine Compound A>

It is preferable that layer A contain a component derived from fluorine compound A as specified below (hereinafter referred to as a fluorine compound A-derived component). If layer A contains a fluorine compound A-derived component, layer A acquires soiling resistance.

A fluorine compound A refers to a compound represented by general formula (1) below.

The B, $R^1$ and $R^f$ in the above general formula indicate a reactive element or hydroxyl group, an alkylene group with a carbon number of 1 to 3 or an ester structure derived therefrom, and a fluoroalkyl group, respectively, and they may have side chains in their structures.

A reactive element as represented by B refers to an element having a functional group that is brought into a chemical reaction by, for instance, radicals generated as a result of an exposure to light, heat or some other form of energy or a hydroxyl group. Specific examples of an element having a functional group that is brought into a chemical reaction by, for instance, radicals generated as a result of an exposure to light, heat or some other form of energy include a vinyl group, allyl group, acryloyl group and methacryloyl group. B may be a hydroxyl group as layer A has a urethane bond.

Consisting only of fluorine atoms and carbon atoms, a fluoroalkyl group is a substituent group in which all hydrogen atoms of an alkyl group have been replaced by fluorine atoms.

Examples of fluorine compound A include 2-(perfluoro butyl)ethanol, 2-(perfluoro hexyl)ethanol, 2-(perfluoro butyl)ethyl acrylate, 2-(perfluoro hexyl)ethyl acrylate, 2-(perfluoro butyl)ethyl methacrylate, 2-(perfluoro hexyl)ethyl methacrylate, perfluoro hexyl ethylene, and 3-(perfluoro hexyl)propylene.

Of these fluorine compound A compounds, those in which B is an acryloyl group are preferable as their soiling resistance is high. More preferably, fluorine compound A containing an acryloyl group as B is 2-(perfluoro hexyl)ethyl acrylate.

When the composition used to form layer A contains fluorine compound A, it is possible to provide layer A with a fluorine compound A-derived component using this composition.

Moreover, it is preferable that the composition used to form layer A contain 0.5 to 25 mass % of a fluorine compound A-derived component with regard to the combined 100 mass % of all components thereof. Using such a composition to form layer A allows the resulting layer to contain 0.5 to 25 mass % of a fluorine compound A-derived component with regard to the combined 100 mass % of all components and provides layer A with particularly excellent self-healing property and soiling resistance. Namely, this makes it possible to completely remove any PVC sheet-derived dioctyl phthalate, cosmetic or the like deposited on the surface of layer A and keep it clean, while maintaining the excellent self-healing property thereof.

If the composition used to form layer A contains a fluorine compound A, it may also contain other fluorine compounds than fluorine compound A. Examples of such a compound include hexafluoropropylene, hexafluoropropylene oxide, perfluoro(propyl vinyl ether), perfluorohexyl iodide, and 2,2-bis(4-hydroxyphenyl)hexafluoropropane.

<Other Additives>

It is preferable that the composition used to form layer A contain an initiator, curing agent and catalyst. The initiator and catalyst are used to promote the curing of fluorine compound A. It is preferable that an initiator be able to start or promote a polymerization, condensation or crosslinking reaction based on, among other things, anions, cations and radicals of a coating composition.

Various types of initiators, curing agents and catalysts may be used. In this regard, an initiator, curing agent and catalyst may be used singly or in combination, with the simultaneous use of two or more initiators, curing agents or catalysts also allowed. Moreover, an acidic catalyst, thermal polymerization initiator, photopolymerization initiator, and so on may be combined. Examples of an acidic catalyst include a hydrochloric acid aqueous solution, formic acid, and acetic acid. Examples of a thermal polymerization initiator include a peroxide and azo compound. Examples of a photopolymerization initiator include an alkylphenone-based compound, sulfur-based compound, acyl phosphine oxide-based compound, and amine-based compound. As a photopolymerization initiator, an alkylphenone-based compound is preferable from the viewpoint of curability. Specific examples of an alkylphenone-based compound include 1-hydroxy-cyclohexyl-phenyl-ketone, 2,2-dimethoxy-1,2-diphenyl ethane-1-one, 2-methyl-1-(4-methyl thiophenyl)-2-morpholino propane-1-one, 2-benzyl-2-dimethyl amino-1-(4-phenyl)-1-butane, 2-(dimethyl amino)-2-[(4-methyl phenyl)methyl]-1-(4-phenyl)-1-butane, 2-benzyl-2-dimethyl amino-1-(4-morpholino phenyl)-1-butane, 2-(dimethyl amino)-2-[(4-methyl phenyl)methyl]-1-[4-(4-morpholinyl)phenyl]-1-butane, 1-cyclohexyl-phenyl ketone, 2-methyl-1-phenyl propane-1-one, and 1-[4-(2-ethoxy)-phenyl]-2-hydroxy-2-methyl-1-propane-1-one.

It is preferable that the amount of an initiator and curing agent contained in the composition used to form layer A be 0.001 part by mass to 30 parts by mass, more preferably 0.05 parts by mass to 20 parts by mass and even more preferably 0.1 parts by mass to 10 parts by mass, with regard to 100 parts by mass of fluorine compound A.

<Other Components of Layer A>

The layer A may contain other components such as an acrylic segment, polyolefin segment and polyester segment.

A polyolefin segment is a polymer with an equivalent structure to a polyolefin resin that comprises repeating units derived from an olefin with a carbon number of 2 to 20.

An acrylic segment is a polymer containing acrylic units as main components, and it is preferable that such acrylic units be contained by 50 mol % or more. Preferable examples include methyl methacrylate units, acrylic methyl units, acrylic ethyl units, and acrylic butyl units. If layer A contains an acrylic segment, it has excellent soiling resistance and toughness.

Apart from a butanediol and/or hexanediol, ethylene glycol, 1,3-propanediol, neopentyl glycol, 2-methyl 1,3-propanediol, 1,4-cyclohexanedimethanol, polytetramethylene glycol, polyethylene glycol, polypropylene glycol, dimer diol, and/or hydrogenated dimer diol may be used as diol components of a polyester segment. As an acid component of a polyester segment, on the other hand, terephthalic acid, naphthalene dicarboxylic acid, isophthalic acid, sebacic acid, adipic acid, azelaic acid, succinic acid, hexahydro terephthalic acid, or the like may be used, and two or more of these components may be contained.

Possible additives to layer A include a heat resistant agent, ultraviolet absorber, photostabilizer, organic or inorganic particles, pigments, dye, mold releasing agent, and antistatic agent.

<Glass Transition Temperature (Tg) of Layer A>

It is preferable that, in the laminated film, layer A have a glass transition temperature (Tg) of −30° C. to 15° C. More preferably, the glass transition temperature (Tg) of layer A is 0° C. to 15° C.

If the glass transition temperature of layer A is −30° C. to 15° C., the self-healing speed greatly improves. It also ensures that the laminated film maintains self-healing property in the low temperature region. If the glass transition temperature of layer A exceeds 15° C., self-healing becomes extremely slow at an ambient temperature of 10° C. or less, while, if the glass transition temperature of layer A is below −30° C., lubricity decreases, giving rise to problems such as difficulty in taking up on a roll, blocking and forming failure. If the glass transition temperature of layer A is 0° C. to 15° C., good self-healing property and soiling resistance can be obtained at an ambient temperature of 5° C.

To have the glass transition temperature of layer A in the −30° C. to 15° C. range, it is preferable that 11 to 40 mass % of a compound containing an isocyanate group be present as part of the combined 100 mass % of all components of the composition used to form layer A.

As another method to have the glass transition temperature of layer A in the −30° C. to 15° C. range, it is preferable to provide layer A with low glass transition temperature components. In particular, it is preferable that layer A have an acrylic segment as a low glass transition temperature component. Examples of an acrylic segment as a low glass transition temperature component include a segment constituted of a polymer of n-butyl acrylate, isobutyl acrylate, n-butyl methacrylate, isobutyl methacrylate and other monomers. If layer A contains an acrylic segment as a low glass transition temperature component, as preferred, the glass transition temperature of layer A can be adjusted to −30° C. to 15° C. by changing the amount contained thereof.

<Scratch Recovery Time of Layer A at 10° C.>

It is preferable that the layer A of the laminated film have a scratch recovery time of 25 seconds or less at a temperature of 10° C. More preferably, the scratch recovery time of layer A at a temperature of 10° C. is 10 seconds or less. If the recovery time is 25 seconds or less, the self-healing speed greatly improves. Moreover, if the recovery time is 10 seconds or less, as preferred, the fall in self-healing property at high forming ratios is small. The recovery time of the laminated film varies with temperature. It is known that the recovery time is longer at low temperatures and shorter at high temperatures. The recovery time of the laminated film also slightly differs from one substrate film to another. It is also known that, if the substrate film has a laminated structure as described above, the recovery time is short, whereas, if it has a single-layer structure as described above, the recovery time is long. However, the difference is only up to 1 second at a temperature of 10° C., so that the impact of this factor on the recovery time is small.

To bring the scratch recovery time of layer A at a temperature of 10° C. to 25 seconds or less, it is preferable that the glass transition temperature of layer A be lowered, and the preferred glass transition temperature of layer A to bring its scratch recovery time at a temperature of 10° C. to 25 seconds or less is −30° C. to 15° C.

<Distribution of Fluorine Atoms>

It is preferable that fluorine atoms account for 0.4% to 50%, more preferably 10% to 50%, of the total number (100%) of fluorine atoms, carbon atoms, nitrogen atoms, oxygen atoms and silicon atoms as detected on the layer A-side surface of the laminated film via XPS. Having the abundance of fluorine atoms on the layer A-side surface at 0.4% to 50% makes its soiling resistance particularly outstanding. As a method to bring the abundance of fluorine atoms on the layer A-side surface to 0.4% to 50%, it is preferable to have layer A contain a fluorine compound A-derived component by 0.5 to 25 mass % with regard to the combined 100 mass % of all components thereof.

It is preferable that the laminated films satisfy the relationship a/b is 0% to 60%, more preferably 5% to 25%, where "a" is the maximum value of fluorine atom detection intensity measurements obtained by TOF-SIMS over the thickness range of 1% to 100% as measured from the layer A-side surface towards the substrate film as a proportion to the entire 100% thickness of the layer, and "b" is the maximum value of fluorine atom detection intensity measurements obtained by TOF-SIMS over the thickness range of 0% to 1%, exclusive, as measured from the layer A-side surface towards the substrate film. Such a structure makes it possible to simultaneously achieve self-healing property and soiling resistance.

"a" signifies a single point where the maximum value of two or more fluorine atom detection intensity measurements obtained over the above range occurs, and the same applies to "b".

More preferably, a/b is 5% to 20%.

The above fluorine compound A(fluorine compound-derived component) has a property to concentrate in the surface region before curing. For this reason, to obtain a laminated film with an a/b ratio of 0% to 60%, it is preferable that the composition used to form layer A contain fluorine compound A.

<Number of Layers Constituting Layer A>

It is preferable that layer A present at least on one side of the substrate film of the laminated film comprise a single layer.

Though it is preferable that the layer A of the laminated film contain a fluorine compound A-derived component, if, for instance, this is achieved by depositing a layer containing a fluorine compound A-derived component over layer A having (1) a (poly)caprolactone segment and (2) a urethane bond, as produced through a laminating step, heating step and aging step to be described later without containing a fluorine compound A-derived component, the surface characteristics end up depending greatly on the fluorine compound A-derived component. As a result, soiling resistance can be obtained but not self-healing property. For this reason, it is preferable that layer A have a single layer configuration wherein it contains a fluorine compound A-derived component outright, as well as a (poly)caprolactone segment and the like, rather than a multi-layer configuration wherein it comprises one or more layers containing a (poly)caprolactone segment and the like and a layer containing fluorine compound A deposited over such a layer or layers.

Namely, it is preferable that a fluorine compound A-derived component be contained in layer A itself, which also contains (1) a (poly)caprolactone segment and (2) a urethane bond.

A layer being a single layer means that the layer concerned has no internal interface that marks a brightness difference of 5% or more. A detailed description will be provided later.

Since it is preferable that, layer A comprise a single layer, it is preferable that, when producing a laminated film, the substrate film be coated only with a composition containing fluorine compound A as a composition used to form layer A and cured. If the substrate film is coated with a composition containing fluorine compound A and cured, fluorine compound A subsequently migrates to the surface of layer A, and this makes it possible to obtain a laminated film wherein layer A comprises a single layer that has a gradient in the distribution of the concentration of a component. Namely, it is preferable that the laminated film be a laminated film obtained by coating a substrate film with a composition used to form layer A that contains fluorine compound A just once, followed by curing.

<Performance of Layer A>

It is important that the laminated film provide a distilled water contact angle on layer A of 95° or more but less than 120° and a diiodomethane contact angle on layer A of 70° or more but less than 87°.

The distilled water contact angle on layer A is more preferably 105° or more but less than 120° and even more preferably 95° or more but less than 120°. The diiodomethane contact angle on layer A is more preferably 75° or more but less than 87° and even more preferably 80° or more but less than 87°.

If the distilled water contact angle on layer A and diiodomethane contact angle on layer A are 95° or more but less than 120° and 70° or more but less than 87°, respectively, soiling resistance is good. Soiling resistance is resistance to a skin care or UV protection cream, oil-based marker pen, PVC sheet-derived dioctyl phthalate, and the like.

To bring the distilled water contact angle on layer A to 95° or more but less than 120° and the diiodomethane contact angle on layer A to 70° or more but less than 87°, it is preferable that layer A contain 0.5 to 25 mass % of a fluorine compound A-derived component with regard to the combined 100 mass % of all components thereof.

It is not impossible to obtain the laminated film on the basis of a laminated layer A by first forming a layer A1 having (1) a (poly)caprolactone segment and (2) a urethane bond over a substrate film and then forming a layer A2 that provides a distilled water contact angle of 95° or more, but less than 120° and a diiodomethane contact angle of 70° or more but less than 87° over layer A1. However, this kind of configuration is not only functionally inferior, as it does not provide adequate self-healing property, but also undesirable in terms of cost because of the need to form two layers separately. In contrast, the laminated film obtained by coating a substrate film with a composition used to form layer A that contains fluorine compound A just once, followed by curing, is an excellent laminated film in terms of both functionality and cost as it has a single-layered layer A.

To adjust the diiodomethane contact angle on layer A to 80° or more, but less than 87°, it is important to incorporate a further special condition into production. Namely, to adjust the diiodomethane contact angle on layer A to 80° or more but less than 87°, it is important to bring fluorine atoms to the surface. While it suffices to just form layer A using a composition that contains fluorine compound A to set a diiodomethane contact angle on layer A of 70° or more but less than 87°, adjusting this angle to 80° or more but less than 87° further requires that fluorine atoms be brought to the surface.

To efficiently bring fluorine compound A to the surface and cure it while it is concentrated in the surface region, namely to collect fluorine compound A-derived component molecules in the surface region of layer A, it is effective to reduce the migration resistance against the movement of fluorine compound A contained in the coating liquid to the surface of layer A and, to this end, it is effective to restrict the curing of the materials constituting layer A other than fluorine compound A. It is, for instance, preferable that a high boiling point solvent (e.g. cyclohexanone or butyl acetate) be used by mixing it into a low boiling point solvent (e.g. methyl ethyl ketone or ethyl acetate) in the composition used to form layer A. As a low boiling point solvent, a solvent with a boiling point of 80° C. or less, more preferably 75° C. to 80° C., is preferable. As a high boiling point solvent, on the other hand, a solvent with a boiling point of 125° C. or more, more preferably 125° C. to 160° C., is preferable. It is preferable that the mass abundance ratio of these solvents be High boiling point solvent:Low boiling point solvent is 1 to 50:99 to 50. It is also preferable that the oxygen concentration in the energy ray irradiation step to be described later be limited to 2 vol % or less by carrying it out in a nitrogen atmosphere as this prevents oxygen from inhibiting the curing of fluorine compound A. Further, it is preferable that, when forming layer A, fluorine compound A be cured by irradiation with an energy ray, with other materials used to form layer A cured by heating. Namely, it is preferable that layer A be formed by carrying out a step to coat a substrate film with a composition used to form layer A that contains fluorine compound A just once, an energy ray irradiation step, a heating step to be described later and an aging step to be described later in that sequence. Carrying out these operations, as preferred, makes it possible to bring the diiodomethane contact angle on layer A to 80° or more but less than 87°.

With the laminated film, it is preferable that the thickness of layer A be set to 15 to 30 μm to obtain a laminated film with good self-healing property and cosmetics resistance. Setting the thickness of layer A to 15 to 30 μm makes it possible to obtain a laminated film having a self-healing effect, as well as good cosmetics resistance.

Since forming reduces the thickness of layer A, it is effective to make layer A thicker beforehand according to the forming ratio when forming a laminated film. The desirable thickness of layer A is 16.5 to 33 μm for forming at a forming ratio of 1.1 and 24 to 48 μm for forming at a forming ratio of 1.6.

It is preferable that the average breaking elongation of the layer A of the laminated film be 65% or more but less than 100%, more preferably 70% or more but less than 100%, at both 80° C. and 150° C. If the average breaking elongation is 65% or more at 80° C. and 150° C., adequate elongation can be maintained, while, if it is less than 100%, conformability with the substrate film is good.

<Layer A Formation Method>

A layer A of the laminated film may, for instance, be produced by following the steps described below in that sequence. To bring the average breaking elongation of layer A at 80° C. and 150° C. to 65% or more but less than 100%, it is particularly preferable that an aging step be placed after the laminating step, heating step and energy ray irradiation step.

Laminating Step

A layer having (1) a (poly)caprolactone segment, (3) a polysiloxane segment and/or polydimethyl siloxane segment and (2) a urethane bond, as well as fluorine compound A (layer A), is laminated onto at least one side of a substrate film. Techniques to laminate layer A onto a substrate film include, for instance, the coating of at least one side of the substrate film with a coating liquid containing a composition used to form layer A and solvents as needed. To carry this out, any generally known coating method, such as gravure coating, micro gravure coating, dye coating, reverse coating, knife coating or bar coating, may be applied.

Heating Step

As well as evaporating any solvents present in the layer, heating can promote crosslinking reactions between the isocyanate group contained in the composition used to form layer A and other segments. It is preferable that the residual amount of the isocyanate group in layer A after the heating step and before the aging step be 10% or less, more preferably 5% or less and even more preferably virtually 0% relative to the amount of the isocyanate group before the heating step. Virtually 0% means an isocyanate group being undetectable when an infrared spectrophotometer analysis is performed. If an isocyanate group remains in large amounts in layer A, the isocyanate group in layer A forms urea bonds in the following aging step by reacting with moisture in the atmosphere, and this causes layer A to rigidify after the aging step and its average breaking elongation to decrease. For this reason, it is preferable to let the reaction of the isocyanate group progress as far as possible (more preferably complete) before the aging step. If the reaction is insufficient, layer A retains tackiness and, when the film is wound up in a roll form, blocking occurs due to adherence between adjoining surfaces, making it difficult to unwind.

It is preferable that the heating temperature in the heating step be 60° C. or more, more preferably 80° C. or more. In view of the risk of a creasing of the substrate film due to heat shrinkage, it is also preferable that the heating temperature be 180° C. or less, more preferably 160° C. or less and even more preferably 100° C. or less, when the thermal evaporation of fluorine compound A due to heating is taken into consideration. If the heating temperature is 60° C. or more, solvents evaporate thoroughly.

The heating time is 1 minute or more, preferably 2 minutes or more and even more preferably 3 minutes or more. It is desirable that, from the viewpoint of productivity and maintenance of the dimensional stability and transparency of the substrate film, the heating time be 5 minutes or less.

It is preferable that the heating temperature and heating time be 60° C. to 160° C. and 1 to 5 minutes, respectively. It is preferable that, from the viewpoint of heating efficiency, hot air blowing be used as the heating method in the heating step, and a generally known hot air dryer or a hot air furnace capable of continuous conveyance based on rollers, floating or the like may be applied.

Energy Ray Irradiation Step

Fluorine compound A in the composition used to form layer A may be cured by irradiating it with an energy ray. With energy ray-based curing, the use of electron beams (EB) or ultraviolet light (UV) is preferable from the viewpoint of general versatility. When using ultraviolet light for curing, it is preferable that the oxygen concentration be 2 vol % or less, more preferably 0 vol %, to prevent inhibition by oxygen. For this reason, it is preferable that curing is carried out in a nitrogen atmosphere (nitrogen purge). If the oxygen concentration is as high as 18 vol % or more, the curing of the outermost surface region becomes insufficient due to an impeded curing, and this sometimes leads to inadequate self-healing property and soiling resistance. The type of ultraviolet lamp suited to ultraviolet light irradiation encompasses, for instance, a discharge lamp, flash lamp, laser, and electrodeless lamp. In the case of ultraviolet light curing based on a high-pressure mercury vapor lamp, a kind of electrical discharge lamp, ultraviolet illuminance is 100 to 3000 mW/cm$^2$, preferably 200 to 2000 mW/cm$^2$ and more preferably 300 to 1500 mW/cm$^2$. Ultraviolet cumulative light dose is 100 to 3000 mJ/cm$^2$, 200 to 2000 mJ/cm$^2$ and more preferably 300 to 1500 mJ/cm$^2$. Ultraviolet light illuminance is the irradiation intensity per unit area of ultraviolet light, which varies with lamp output, emission spectrum efficiently, diameter of the luminous bulb, design of the reflecting mirror, and distance between the light source and irradiated object. However, illuminance does not change with film conveyance speed. Ultraviolet cumulative light dose is the irradiation energy per unit area of ultraviolet light, which is the total energy held by all ultraviolet photons that reach a unit area of the irradiated surface. Ultraviolet cumulative light dose is inversely proportional to irradiation speed, i.e. the speed of the film running under the light source, and proportional to irradiation frequency and the number of lamps. When heat is used for curing, the drying step and curing step may take place simultaneously.

Aging Step

It is preferable that, upon being heated and cured in the heating step and energy ray irradiation step, respectively, the laminated film undergo an aging treatment. The aging temperature is preferably 20 to 60° C. and more preferably 40° C. to 60° C. The aging time is preferably 3 days or more, more preferably 7 days or more and even more preferably 20 days or more. It is preferable that an aging treatment be provided in the aging step to complete the curing of layer A as it brings the average breaking elongation of layer A to 65% or more but less than 100% by increasing the number of urethane bonds. It is preferable that, as sheets or rolls, the laminated film undergo an aging treatment in a temperature-controllable thermostatic chamber.

The laminated film is suited to forming applications, particularly formed decorative films to be applied to chasses of personal computers, mobile phones, and the like. The laminated film may be turned into formed products by applying various forming methods, including injection molding, pneumatic forming, vacuum forming, thermal forming and press molding. It is particularly advantageously applied to forming processes that involve heating to 80° C. to 180° C.

It is preferable that, when used for a forming application, the laminated film take a forming ratio of 1.1 to 1.6. Since formed products tend to have particularly high forming ratios in bent sections and curved sections, setting forming ratios for bent sections and curved sections to 1.1 to 1.6, as preferred, ensures that deep-drawn forming is accommodated.

The laminated film may also be advantageously used as part of a touch panel.

Measurement Methods for Characteristics and Evaluation Methods for Effects

Measurement methods for characteristics and evaluation method for effects are as described below.

(1) Thickness of Layer A and Number of Layers Thereof
Thickness:

A cross-sectional sample was obtained by slicing a laminated film or a formed film, as the case may be, with a microtome diamond knife (manufactured by Microtome Japan, RMS-50) (named "method A"). The sample obtained using method A is called "sample A". This sample, sample A, is left to stand in a 1 mass % osmium tetraoxide solution (4° C.) for 2 hours. It is then washed three times in 100 ml of ethanol, pure to 99.8 mass % or more, each time for 20 minutes with shaking, to obtain a new sample (named "method B"). The sample obtained using method B is called "sample B". Another different sample is then prepared by going through the same steps using a 1 mass % ruthenium tetroxide solution (named "method C"). The sample obtained using method C is called "sample C". Next, samples A, B and C are observed using a transmission electron microscope (manufactured by Hitachi, Ltd., H-7100FA), and magnified images are taken of them with a magnification of up to 40,000× according to the observed layer thickness, with the method associated with the sample that provides the highest contrast selected.

The sample associated with the selected method was subjected to a layer thickness measurement. The measurement was made on a total of 10 samples associated with the selected method, and an average was taken of the results for use as the measured value. To establish measurement locations, a 50 mm-square piece was cut from the central area of the film specimen, and three points were selected from it for use in the measurements.

Number of Layers:

The number of layers is measured by conducting a brightness study on the image used for layer thickness measurement using image analysis software supplied by Nippon Roper K.K., called Image-Pro Plus. Namely, the brightness of the layer laminated onto the substrate film is measured, and the result is evaluated in terms of whether one or more internal interface that is roughly parallel to the substrate film and marks a brightness difference of 5% or more can be established.

More specifically, if the brightness of the layer laminated onto the substrate film is measured and one or more interface that is roughly parallel to the substrate film and marks a brightness difference of 5% or more is detected, this layer is deemed to comprise two or more layers. If, on the other hand, the brightness of the layer laminated onto the substrate film is measured and one or more interface that is roughly parallel to the substrate film and marks a brightness difference of 5% or more is not detected, this layer is deemed to comprise only one layer.

Since the judgment criterion is whether one or more internal interface that is roughly parallel to the substrate film and marks a brightness difference of 5% or more can be established, even if the layer contains a portion that marks a brightness difference of 5% or more, it is still deemed to comprise only one layer, as long as such a portion is partial, making it impossible to establish one or more interface that is roughly parallel to the substrate film and marks a brightness difference of 5% or more.

Moreover, since layers with a thickness of less than 0.01 nm are difficult to even observe, any layer with a thickness of less than 0.01 nm is ignored.

(2) Average Breaking Elongation of Layer A at 80° C. and 150° C.

A piece measuring 10 mm wide and 200 mm long was cut out of a laminated film and then, while being held with chucks, stretched in the length direction at a tensile speed of 100 mm/min using an Instron-type tensile testing machine (manufactured by Instron Corporation, ultra-high precision material testing machine MODEL5848). At a measuring ambient temperature of 80° C., a specimen was taken at every percentage point of elongation. Thin cross-sectional slices were cut from each of the resulting specimens, and layer A was observed at a magnification where its thickness appears to be 30 mm or more on the monitor screen of the transmission electron microscope. The result was then assessed as cracked (layer A destroyed), if a crack that is 50% or more of the average thickness of layer A in size has been generated, with the corresponding elongation taken as breaking elongation of the film (80° C.—measurement 1). The same measurement was repeated two more times to obtain two other readings, breaking elongation (80° C.—measurement 2) and breaking elongation (80° C.—measurement 3), with the average of the three values used as the average breaking elongation of layer A at 80° C.

Next, the average breaking elongation of layer A at 150° C. was measured in the same manner as the 80° C. value, except that the measuring ambient temperature was changed from 80° C. to 150° C.

(3) Fluorine Atom Abundance in Surface Region of Layer A (X-Ray Photoelectron Spectroscopy Analysis: XPS)

The VersaProbe PHI 5000, manufactured by ULVAC-PHI, Inc., was used for the measurement. Measurement conditions were as specified below.

X-ray source: Mono-Al
Output: 24.2 W
X-ray beam diameter: 100 μm
Ejection angle: 45°
Pass energy: 23.50 eV The abundance ratio of various atoms is determined by measuring peak areas from a high resolution spectrum and applying transfer function-corrected atom sensitivity factors, with the bundled software used for analysis.

The abundance of fluorine atoms on the layer A-side surface of the laminated film was determined relative to the combined number of all fluorine atoms, carbon atoms, nitrogen atoms, oxygen atoms and silicon atoms present as 100% as detected in XPS (labeled as "Abundance of fluorine atom on surface of layer A [%]" in the tables). In this measurement, any "-" entry in the tables denotes that the quantity being measured was below the detection limit (fluorine atoms not detected).

(4) a/b (Time-of-Flight Secondary Ion Mass Spectrometry: TOF-SIMS)

Using a TOF-SIMS system manufactured by ION TOF, the fluorine atom detection intensity distribution with regard to thickness as measured from the layer A-side surface of the laminated film towards the substrate film as per the method described in (1) was obtained in accordance with secondary ion mass analysis. Measurement conditions were as specified below.

Analysis Parameters
Analysis beam: $Bi^+$, negative
Current beam: 1.000 pA
Area: $50 \times 50$ μm$^2$
Sputter Parameters
Sputter beam: $Cs^+$, 10 keV
Current beam: 39.000 nA
Area: $200 \times 200$ μm$^2$ The tables show a/b [%], where "a" is the maximum value of fluorine atom detection intensity measurements obtained by TOF-SIMS over the thickness of 1% to 100% as measured from the layer A-side surface towards the substrate film as a proportion to the entire 100% thickness of the layer, and "b" is the maximum value of fluorine atom detection intensity measurements obtained by TOF-SIMS over the thickness range of 0% to 1%, exclusive, as measured from the layer A-side surface towards the substrate film. In this measurement, any "-" entry in the tables denotes that the quantity being measured was below the detection limit (fluorine atoms not detected).

(5) Self-Healing Property of Layer A

The coated film surface was scratched in accordance with JIS $K_{5600}$ (1999) "Scratch Hardness (Pencil Method)". Measurement conditions were as specified below.
Scratching equipment: Pencil hardness tester (KT-VF2391)
Pencil: HB pencil ("Uni", manufactured by Mitsubishi Pencil Co., Ltd.)
Load: 750 g
Scratching speed: 10 mm/s With a high-speed camera installed directly above the sample, the time taken by the brightness of a scratch 10 seconds after the scratching as observed on the monitor screen to fall below 1.0% was measured as recovery time. A short recovery time directly indicates a higher self-healing property. The measurement was made three times, at 5° C., 10° C. and 20° C., inside a temperature-controlled acrylic box, and an average was taken of the measured values. Three measurement points were set in a 50 mm-square piece cut from the middle part of a formed film. The photographic conditions of the camera were as specified below.
Light source: A ring light, model LuminarAce LA-150UX, mounted at the end of the camera
Camera: VW-6000 (manufactured by Keyence Corporation)
Sampling rate: 10 pps
Exposure time: 20000 μs.

When recovery from a scratch did not occur, "-" was entered in the table.

(6) Tg of Layer A

Using a differential scanning calorimetry (DSC) system, measurements and calculations were carried out in accordance with JIS K 7122 (1987). A sample shaved off layer A using a blade knife was placed in an aluminum pan and heated from −100° C. to 100° C. at a rate of 20° C./min.
Equipment: Robotic DSC model RDC220, manufactured by Seiko Electronics Industrial Co., Ltd.
Data analysis: Disk session SSC/5200
Sample mass: 5 mg.

(7) Contact Angle

After being left to stand at an ambient temperature of 25° C. and a relative humidity of 65% for 24 hours, samples were subjected to the measurement of contact angles for distilled water and diiodomethane (manufactured by Nacalai Tesque Inc.), each 10 seconds after pipetting using a contact angle gauge, model CA-D manufactured by Kyowa Interface Science Co., Ltd. The measurement was made three times for each sample, with an average taken of the readings as the contact angle.

(8) Soiling Resistance (Cosmetics)

After application of 0.5 g of Atrix hand cream, manufactured by Kao Corporation, on its surface, a 5 cm-square piece cut out as a specimen was left to stand at an ambient temperature of 40° C. and a relative humidity of 95% for 6 hours and then at an ambient temperature of 25° C. and a relative humidity of 65% for 30 minutes, followed by a thorough wiping of the surface with gauze. The specimen was again left to stand at an ambient temperature of 25° C. and a relative humidity of 65% for 24 hours, and the condition of its surface was observed, with the result assessed against the criteria listed below.

○ (Excellent): No white spotting.
● (Good): Little white spotting.
Δ (Satisfactory): Occurrence of white spotting but cleanable by wiping.
x (Unsatisfactory): Occurrence of white spotting. Wiping cannot prevent recurrence after the sample is left to stand at an ambient temperature 25° C. and a relative humidity of 65% for 24 hours.

(9) Soiling Resistance (Polyvinyl Chloride Sheet)

A 4 cm-square piece was cut out of a polyvinyl chloride sheet, Achilles Type C+/Achilles Pale Blue Transparent manufactured by Achilles Corp., and placed over the middle of a 5 cm-square cut-out specimen. The specimen, with the polyvinyl chloride sheet on top, was then left to stand for 6 hours under a uniform load of 500 g at an ambient temperature of 40° C. and a relative humidity of 95%. The specimen was then retrieved and its surface was thoroughly wiped with gauze, followed by an observation of surface condition and an assessment according to the criteria listed below.

○ (Excellent): No change in appearance.
Δ (Good): Slight marking observed in the area where a polyvinyl chloride sheet was placed.
x (Unsatisfactory): Obvious marking observed in the area where a polyvinyl chloride sheet was placed.

(10) Forming

With its edges held with clips, a laminated film was subjected to simultaneous biaxial stretching using a three-chamber stretcher (KARO IV, manufactured by Brückner). To prevent the sample from coming off the clips during this process, the edges of the four sides of the sample were tucked between the folded halves of a 10 mm-wide 100 μm-thick polyethylene terephthalate film for reinforcement purposes. This method stretches a laminated film in the same manner as an actual forming process, the stretched film obtained can be considered as a formed product (formed film). In this regard, a just preheated film, which is yet to undergo stretching, is also deemed to be a formed film. The ratio of stretching during forming shows how large the film is enlarged during forming as a multiple of its original dimension.
Film size: 100 mm×100 mm
Clip holding pressure: 5 MPa
Preheating and stretching temperature: 100° C.
Fan air output: 50%
Preheating time: 40 seconds
Stretching speed: 20%/sec.

(11) Forming Ratio

Cross-sectional samples were obtained by cutting a laminated film and formed film with a microtome diamond knife (manufactured by Microtome Japan, RMS-50) and deposition-coated with platinum. Each sample was then subjected to the measurement of the thickness of layer A using an SEM (manufactured by Hitachi, Ltd.) to calculate the forming ratio from the thickness of layer A before and after forming according to the formula shown below. To establish measurement locations, a 50 mm-square piece was cut from the central area of the laminated film or formed film, as the case may be, and three points were selected from it for use in the measurements. Since the forming ratio relates to the change in thickness, it is a different concept from the ratio of stretching during forming mentioned above.

Thickness of Layer A Before Forming/Thickness of Layer A after Forming

(12) Formability

After forming, the condition of layer A was visually inspected, and an assessment was made according to the criteria listed below. In this regard, the inspection only covered the 50 mm-square area in the middle of the formed film.

◯ (Good): Good surface condition without cracking or peeling.

x (Unsatisfactory): Practically unusable due to occurrence of cracking and/or peeling.

EXAMPLES

Reference Example 1

Preparation of Raw Material A1

<Synthesis of Polysiloxane (a)>

In a 500 ml flask featuring an agitator, thermometer, condenser and nitrogen gas introduction tube, 106 parts by mass of ethanol, 270 parts by mass of methyl trimethoxysilane, 23 parts by mass of γ-methacryloyloxy propyl methyl dimethoxy silane, 100 parts by mass of deionized water, 1 part by mass of 1 mass % hydrochloric acid and 0.1 parts by mass of hydroquinone monomethyl ether were placed and made to react at 80° C. for 3 hours to synthesize polysiloxane (a). This was adjusted to 50 mass % using methyl isobutyl ketone.

<Synthesis of Polydimethylsiloxane Block Copolymer (a)>

Using the same apparatus as the synthesis of polysiloxane (a), 50 parts by mass of toluene, 50 parts by mass of methyl isobutyl ketone, 20 parts by mass of a polydimethyl siloxane polymer polymerization initiator (manufactured by Wako Pure Chemical Industries, Ltd., VPS-0501), 18 parts by mass of methyl methacrylate, 38 parts by mass of butyl methacrylate, 23 parts by mass of 2-hydroxyethyl methacrylate, 1 part by mass of methacrylic acid and 0.5 parts by mass of 1-thioglycerin were placed and made to react at 180° C. for 8 hours to obtain polydimethyl siloxane block copolymer (a). The resulting block copolymer had a solid content of 50 mass %.

<Synthesis of Raw Material A1>

Raw material A1 with a solid content of 40 mass % was prepared by adding 15 parts by mass of an isocyanurate of hexamethylene diisocyanate (Takeda Pharmaceutical Co., Ltd., Takenate D-170N) to 100 parts by mass of a mixture comprising 75 parts by mass of polydimethyl siloxane block copolymer (a), 10 parts by mass of polysiloxane (a) and 15 parts by mass of a polycaprolactone triol having a hydroxyl group (manufactured by Daicel Chemical Industries, Ltd., PLACCEL 308, molecular weight 850) and diluting it using methyl ethyl ketone.

Working Example 1

After adding 10 parts by mass of 2-(perfluoro hexyl)ethyl acrylate and 0.5 parts by mass of 1-hydroxy-cyclohexyl-phenyl-ketone to raw material A1 and further adjusting the solid content to 30 mass % using a solvent prepared by mixing methyl ethyl ketone and cyclohexanone at a mass ratio of 93:7, a 100 μm-thick polyester substrate film (manufactured by Toray Industries, Inc., "Lumirror" U46) was coated with the resulting compound using a wire bar to form layer A with a target post-aging step thickness of 30 μm. After coating, the film was heated at 100° C. for 2 minutes using a hot air dryer (heating step). Next, it was irradiated with ultraviolet light at an illuminance of 600 W/cm$^2$ and a cumulative light dose of 800 mJ/cm$^2$ under an oxygen concentration of 0.1 vol % using a 160 W/cm high-pressure mercury vapor lamp (manufactured by Eye Graphics Co., Ltd.) (energy ray irradiation step), followed by heating at 40° C. for 14 days (aging step), to obtain a laminated film. The resulting film was then formed. In this example, there was no stretching, with only preheating provided.

The evaluation results for the resulting laminated film and formed film are shown in Table 1. Excellent self-healing property and excellent soiling resistance were exhibited.

Working Examples 2 to 3

A laminated film and formed film were obtained in the same manner as Working example 1, except that the thickness of layer A and stretching ratios were changed. In Working example 2, a stretching ratio in the vertical direction of 1.2 and a stretching ratio in the horizontal direction of 1.2 were used during forming, while the post-aging step thickness of layer A was set to 23 μM. In working example 3, a stretching ratio in the vertical direction of 1.3 and a stretching ratio in the horizontal direction of 1.3 were used during forming, while the post-aging step thickness of layer A was set to 19 μm. The obtained results are shown in Table 1. Excellent self-healing property and excellent soiling resistance were exhibited, even when layer A was made thin. Moreover, no forming defects were observed.

Working Example 4

A laminated film and formed film were obtained in the same manner as Working example 1, except that 10 parts by mass of 2-(perfluoro hexyl)ethyl acrylate, instead of 10 parts by mass of 2-(perfluoro butyl)ethyl methacrylate, was added. The obtained results are shown in Table 1. Excellent self-healing property and excellent soiling resistance were exhibited.

Working Examples 5 to 6

A laminated film and formed film were obtained in the same manner as Working example 4, except that the thickness of layer A and stretching ratios were changed. In Working example 5, a stretching ratio in the vertical direction of 1.2 and a stretching ratio in the horizontal direction of 1.2 were used during forming, while the post-aging step thickness of layer A was set to 23 μm. In Working example 6, a stretching ratio in the vertical direction of 1.3 and a stretching ratio in the horizontal direction of 1.3 were used during forming, while the post-aging step thickness of layer A was set to 19 μm. The obtained results are shown in Table 1. Excellent self-healing property and excellent soiling resistance were exhibited, even when layer A was made thin. Moreover, no forming defects were observed.

Working Example 7

A laminated film and formed film were obtained in the same manner as Working example 1, except that 10 parts by mass of 2-(perfluoro hexyl)ethyl acrylate, instead of 10 parts by mass of 2-(perfluoro hexyl)ethyl methacrylate, was added. The obtained results are shown in Table 1. Excellent self-healing property and excellent soiling resistance were exhibited.

Working Examples 8 to 9

A laminated film and formed film were obtained in the same manner as Working example 7, except that the thickness of layer A and stretching ratios were changed. In Working example 8, a stretching ratio in the vertical direction of 1.2 and a stretching ratio in the horizontal direction of 1.2 were used during forming, while the post-aging step thickness of layer A was set to 23 μm. In Working example 9, a stretching ratio in the vertical direction of 1.3 and a stretching ratio in the horizontal direction of 1.3 were used during forming, while the post-aging step thickness of layer A was set to 19 μM. The obtained results are shown in Table 1. Excellent self-healing property and excellent soiling resistance were exhibited, even when layer A was made thin. Moreover, no forming defects were observed.

Working Example 10

After adding 10 parts by mass of 2-(perfluoro hexyl)ethanol to raw material A1, a 100 μm-thick polyester substrate film (manufactured by Toray Industries, Inc., "Lumirror" U46) was coated with the resulting compound using a wire bar to form layer A with a target post-aging step thickness of 30 μm. After coating, the film was heated at 160° C. for 2 minutes using a hot air dryer (heating step), followed by heating at 40° C. for 14 days (aging step), to obtain a laminated film. The resulting film was then formed. In this example, there was no stretching, with only preheating provided. The obtained results are shown in Table 1.

The evaluation results for the resulting laminated film and formed film are shown in Table 1. Excellent self-healing property and excellent soiling resistance were exhibited.

Working Examples 11 to 12

A laminated film and formed film were obtained in the same manner as Working example 10, except that the thickness of layer A and stretching ratios were changed. In Working example 11, a stretching ratio in the vertical direction of 1.2 and a stretching ratio in the horizontal direction of 1.2 were used during forming, while the post-aging step thickness of layer A was set to 23 μM. In Working example 12, a stretching ratio in the vertical direction of 1.3 and a stretching ratio in the horizontal direction of 1.3 were used during forming, while the post-aging step thickness of layer A was set to 19 μm. The obtained results are shown in Table 1. Excellent self-healing property and excellent soiling resistance were exhibited, even when layer A was made thin. Moreover, no forming defects were observed.

Working Example 13

A laminated film and formed film were obtained in the same manner as Working example 1, except that the amount of 2-(perfluoro hexyl)ethyl acrylate added was changed to 3 parts by mass. The obtained results are shown in Table 1. Excellent self-healing property and excellent soiling resistance were exhibited.

Working Examples 14 to 15

A laminated film and formed film were obtained in the same manner as Working example 13, except that the thickness of layer A and stretching ratios were changed. In Working example 14, a stretching ratio in the vertical direction of 1.2 and a stretching ratio in the horizontal direction of 1.2 were used during forming, while the post-aging step thickness of layer A was set to 23 μm. In Working example 15, a stretching ratio in the vertical direction of 1.3 and a stretching ratio in the horizontal direction of 1.3 were used during forming, while the post-aging step thickness of layer A was set to 19 μm. The obtained results are shown in Table 1. Excellent self-healing property and excellent soiling resistance were exhibited, even when layer A was made thin. Moreover, no forming defects were observed.

Working Example 16

A laminated film and formed film were obtained in the same manner as Working example 1, except that the amount of 2-(perfluoro hexyl)ethyl acrylate added was changed to 20 parts by mass. The obtained results are shown in Table 1. Excellent self-healing property and excellent soiling resistance were exhibited.

Working Example 17 to 18

A laminated film and formed film were obtained in the same manner as Working example 16, except that the thickness of layer A and stretching ratios were changed. In Working example 17, a stretching ratio in the vertical direction of 1.2 and a stretching ratio in the horizontal direction of 1.2 were used during forming, while the post-aging step thickness of layer A was set to 23 μm. In Working example 18, a stretching ratio in the vertical direction of 1.3 and a stretching ratio in the horizontal direction of 1.3 were used during forming, while the post-aging step thickness of layer A was set to 19 μm. The obtained results are shown in Table 1. Excellent self-healing property and excellent soiling resistance were exhibited, even when layer A was made thin. Moreover, no forming defects were observed.

Reference Example 2

Preparation of Raw Material A2

<Synthesis of Raw Material A2>

Raw material A2 with a solid content of 40 mass % was prepared by adding 15 parts by mass of a biuret of hexamethylene diisocyanate (manufactured by Bayer AG, Desmodur N3200) to 100 parts by mass of a mixture comprising 75 parts by mass of polydimethyl siloxane block copolymer (a), 10 parts by mass of polysiloxane (a) and 15 parts by mass of a polycaprolactone triol having a hydroxyl group (manufactured by Daicel Chemical Industries, Ltd., PLACCEL 308, molecular weight 850) and diluting it using methyl ethyl ketone.

Working Example 19

A laminated film was obtained using raw material A2 under the same conditions as Working example 1. The resulting film was then formed in the same manner as Working example 1. The evaluation results for the resulting laminated film and formed film are shown in Table 1, Excellent self-healing property was exhibited even at low temperatures.

Working Examples 20 to 21

A laminated film and formed film were obtained in the same manner as Working example 19, except that the thickness of layer A and stretching ratios were changed. In Working example 20, a stretching ratio in the vertical direction of 1.2 and a stretching ratio in the horizontal direction of 1.2 were used during forming, while the post-aging step thickness of layer A was set to 23 μm. In Working example 21, a stretching ratio in the vertical direction of 1.3 and a stretching ratio in the horizontal direction of 1.3 were used during forming, while the post-aging step thickness of layer A was set to 19 μm. The obtained results are shown in Table 1. Excellent self-healing property and excellent soiling resistance were exhibited, even when layer A was made thin. Moreover, no forming defects were observed.

Working Example 22

As polyester resin C, polyethylene terephthalate (hereinafter also expressed as "PET") with an intrinsic viscosity of 0.65 and a melting point of 255° C. [manufactured by Toray Industries, Inc., F20S] was used, while, as polyester resin D, a compound obtained by adding 0.1 mass % of "Adeka Stab" AS36 [manufactured by Adeka Corporation], which is an antioxidant, to a polyethylene terephthalate copolymer (PET copolymerized with 30 mol % of cyclohexanedicarboxylic acid and 20 mol % of a spiroglycol component) with an intrinsic viscosity of 0.72 was used. Such polyester resin C and polyester resin D were delivered to separate extruders after drying.

Polyester resin C and polyester resin D were melted to a temperature of 270° C. in their respective extruders and passed through five FSS-type leaf disk filters. While being weighed to obtain a gear pump discharge ratio of polyester resin C/polyester resin D=1.2/1, they were alternately laminated using slit plate 1 with 267 slits, slit plate 2 with 269 slits and slit plate 3 with 267 slits and converged in a feedblock to obtain a 801-layer laminate. Inside the feedblock, the laminate, comprising 400 polyester resin C layers and 401 polyester resin D layers, acquired an alternately laid polyester resin C layer/polyester resin D structure, with the thickness of each type of layer gradually increasing from the top surface to the bottom surface. Moreover, the slit shape was designed in such a manner as to ensure any adjoining pair of layers C and D have almost the same thicknesses. Such a design provides a reflective wavelength range of 350 nm to 1200 nm. The resulting total 801-layer laminate was supplied to a multi-manifold die, where a layer comprising polyester resin A, supplied from another extruder, was formed over the top surface of the laminate, followed by forming into a sheet shape. It was then quench-solidified on an electrostatically charged casting drum whose surface temperature was maintained at 25°. The flow path shape and total discharge rate were set so that the process took about 8 minutes to progress from the convergence of polyester resin C and polyester resin D to quench solidification on a casting drum.

The resulting cast film was first heated via a group of rolls set to 75° C. and then stretched 3.0-fold in the vertical direction, while being rapidly heated from both sides with a radiation heater, as it passed through a 100 mm stretching section, followed by short cooling. Next, this uniaxially stretched film was led to a tenter, where, after preheating with 100° C. hot air, it was stretched 3.3-fold in the horizontal direction at a temperature of 110° C. The stretched film immediately underwent a heat treatment involving 235° C. hot air in the tenter, and was then provided with a 5% width-direction relaxation treatment at the same temperature. After this, it was slowly cooled at room temperature and taken up. The thickness of the resulting film was 100 μm. It had an excellent gloss tone without any interlayer peeling.

By forming layer A over this film in the same manner as Working example 1, a laminated film and formed film were obtained. The obtained results are shown in Table 1. The resulting laminated film and formed film had an excellent metallic color and self-healing property.

Working Example 23

A copolymerized polyester in which a 1,4-cyclohexanedimethanol component was copolymerized into the glycol component by 33 mol % (manufactured by Eastman Chemical Company, Eatster PETG6763) and PET with an intrinsic viscosity of 0.65 and a melting point of 255° C. [manufactured by Toray Industries, Inc., F20S] were mixed at a mass ratio of 76:24. The mixture was melt-kneaded at 280° C. using a vented twin screw extruder. As a result, a copolymerized polyethylene terephthalate resin with 25-mol % 1,4-cyclohexanedimethanol, in which a diethylene glycol, obtained as a by-product, was copolymerized into the glycol component of the resin by 2 mol %, was obtained. This compound is referred to as a 25-mol % 1,4-cyclohexanedimethanol-copolymerized polyethylene terephthalate resin (with a diethylene glycol copolymerization rate of 2 mol %).

PET with an intrinsic viscosity of 0.65 and a melting point of 255° C. [manufactured by Toray Industries, Inc., F20S] and a 25-mol % 1,4-cyclohexanedimethanol-copolymerized polyethylene terephthalate resin (with a diethylene glycol copolymerization rate of 2 mol %) were mixed at a mass ratio of 70:30. After drying at 180° C. for 4 hours using a vacuum dryer to thoroughly remove moisture, the mixture was delivered to a single screw extruder, where melting at 275° C., removal of foreign matter and equalization of the extrusion rate took place. The mixture was then discharged in a sheet form onto a 25° C. temperature-controlled cooling drum via a T-die. During this step, the cooling drum was electrostatically charged using 0.1 mm-diam. wire-shaped electrodes to ensure close contacted, with an unstretched film obtained in the process.

After preheating at 90° C. using a heating roller, the unstretched film was stretched 3.2-fold in the length direction at a stretching temperature of 95° C., followed immediately by cooling to 40° C. using a temperature-controlled metal roll.

Using a tenter-type lateral stretching machine, the film was then preheated at 90° C. and stretched 3.5-fold in the width direction at 100° C., followed immediately by a 210° C. heat treatment, which lasted 5 seconds under 4% width-direction relaxation inside the tenter, to obtain a 188 μm-thick biaxially oriented polyester film. The resulting biaxially oriented polyester film was outstanding in transparency and formability, despite a somewhat low scratch resistance.

Based on this biaxially oriented polyester film, a laminated film and formed film were obtained by forming layer A in the same manner as Working example 1. The obtained results are shown in Table 1. The resulting laminated film and formed film had excellent self-healing property.

Working Example 24

A laminated film and formed film were obtained in the same manner as Working example 1, except that the temperature at the heating step was changed to 160° C. The obtained results are shown in Table 1. Excellent self-healing property and excellent soiling resistance were exhibited.

Working Example 25

A laminated film and formed film were obtained in the same manner as Working example 1, except that the solid content was changed to 40 mass %. The obtained results are shown in Table 1. Excellent self-healing property and excellent soiling resistance were exhibited.

Working Example 26

A laminated film and formed film were obtained in the same manner as Working example 25, except that the temperature at the heating step was changed to 160° C. The obtained results are shown in Table 1. Excellent self-healing property and excellent soiling resistance were exhibited.

Working Example 27

A laminated film and formed film were obtained in the same manner as Working example 1, except that methyl ethyl ketone was used to dilute raw material A1. The obtained results are shown in Table 1. Excellent self-healing property was exhibited.

Working Example 28

A laminated film and formed film were obtained in the same manner as Working example 27, except that the temperature at the heating step was changed to 160° C. The obtained results are shown in Table 1. Excellent self-healing property was exhibited.

Working Example 29

A laminated film and formed film were obtained in the same manner as Working example 27, except that the solid content was changed to 40 mass %. The obtained results are shown in Table 1. Excellent self-healing property was exhibited.

Working Example 30

A laminated film and formed film were obtained in the same manner as Working example 28, except that the solid content was changed to 40 mass %. The obtained results are shown in Table 1. Excellent self-healing property was exhibited.

Working Example 31

A laminated film and formed film were obtained in the same manner as Working example 1, except that the oxygen concentration in the energy ray irradiation step was changed to 21 vol %. The obtained results are shown in Table 1. Excellent self-healing property was exhibited.

Working Example 32

A laminated film and formed film were obtained in the same manner as Working example 31, except that the temperature at the heating step was changed to 160° C. The obtained results are shown in Table 1. Excellent self-healing property was exhibited.

Working Example 33

A laminated film and formed film were obtained in the same manner as Working example 31, except that the solid content was changed to 40 mass %. The obtained results are shown in Table 1, Excellent self-healing property was exhibited.

Working Example 34

A laminated film and formed film were obtained in the same manner as Working example 32, except that the solid content was changed to 40 mass %. The obtained results are shown in Table 1. Excellent self-healing property was exhibited.

Working Example 35

A laminated film and formed film were obtained in the same manner as Working example 31, except that methyl ethyl ketone was used to dilute raw material A. The obtained results are shown in Table 1. Excellent self-healing property was exhibited.

Working Example 36

A laminated film and formed film were obtained in the same manner as Working example 35, except that the temperature at the heating step was changed to 160° C. The obtained results are shown in Table 1. Excellent self-healing property was exhibited.

Working Example 37

A laminated film and formed film were obtained in the same manner as Working example 35, except that the solid content was changed to 40 mass %. The obtained results are shown in Table 1. Excellent self-healing property was exhibited.

Working Example 38

A laminated film and formed film were obtained in the same manner as Working example 37, except that the temperature at the heating step was changed to 160° C. The obtained results are shown in Table 1. Excellent self-healing property was exhibited.

Reference Example 3

Preparation of Raw Material A3

<Synthesis of Raw Material A3>
One hundred parts by mass of toluene, 50 parts by mass of 2-isocyanate ethyl-2,6-diisocyanate caproate, 59 parts by mass of a polycaprolactone-modified hydroxyethyl acrylate (manufactured by Daicel Chemical Industries, Ltd., PLACCEL FA1), 20 parts by mass of a polycaprolactone-modified hydroxyethyl acrylate (manufactured by Daicel Chemical Industries, Ltd., PLACCEL FA5) and 0.02 parts by mass of hydroquinone monomethyl ether were mixed, heated to 40° C. and held at that temperature for 12 hours. After this, 82 parts by mass of a polycaprolactone triol (manufactured by Daicel Chemical Industries, Ltd., PLACCEL 308, molecular weight 850) was added, and the mixture was held at 80° C. for 30 minutes. Next, 0.02 parts by mass of dibutyltin laurate was added, and the mixture was held at 80° C. for 24 hours, followed by the addition of 111 part by mass of toluene, to obtain urethane acrylate with a solid content of 50 mass %. Finally, 3 parts by mass of 1-hydroxy-cyclohexyl-phenyl-ketone was mixed into 100 parts by mass of the resulting urethane acrylate to prepare an active energy ray-curing composition.

Working Example 39

After adding 10 parts by mass of 2-(perfluoro hexyl)ethyl acrylate and 0.5 parts by mass of 1-hydroxy-cyclohexyl-phenyl-ketone to raw material A3 and further adjusting the solid content to 30 mass % using a solvent prepared by mixing methyl ethyl ketone and cyclohexanone at a mass ratio of 93:7, a 100 μm-thick polyester substrate film (manufactured by Toray Industries, Inc., "Lumirror" U46) was coated with the resulting compound using a wire bar to form layer A with a target post-aging step thickness of 30 μm. After coating, the film was heated at 100° C. for 2 minutes using a hot air dryer (heating step). Next, it was irradiated with ultraviolet light at an illuminance of 600 W/cm$^2$ and a cumulative light dose of 800 mJ/cm$^2$ under an oxygen concentration of 0.1 vol % using a 160 W/cm high-pressure mercury vapor lamp (manufactured by Eye Graphics Co., Ltd.) (energy ray irradiation step) to obtain a laminated film. The resulting film was then formed. In this example, there was no stretching, with only preheating provided. The obtained results are shown in Table 1.

The evaluation results for the resulting laminated film and formed film are shown in Table 1. Excellent self-healing property and excellent soiling resistance were exhibited.

<Synthesis of Raw Material A4>

One hundred parts by mass of toluene, 25 parts by mass of methyl-2,6-diisocyanate hexanoate, 11 part by mass of 2-hydroxyethyl acrylate, 34 parts by mass of a polycaprolactone-modified hydroxyethyl acrylate (manufactured by Daicel Chemical Industries, Ltd., PLACCEL FAS) and 0.02 parts by mass of hydroquinone monomethyl ether were mixed, heated to 40° C. and held at that temperature for 12 hours. After this, 141 part by mass of a polycaprolactone diols (manufactured by Daicel Chemical Industries, Ltd., PLACCEL 220) was added, and the mixture was held at 80° C. for 30 minutes. Next, 0.02 parts by mass of dibutyltin laurate was added, and the mixture was held at 80° C. for 24 hours, followed by the addition of 111 part by mass of toluene, to obtain urethane acrylate with a solid content of 50 mass %.

Finally, 10 parts by mass of triethylene glycol diacrylate (manufactured by Kyoeisha Chemical Co., Ltd., Light Acrylate 3EG-A), 3 parts by mass of stearyl acrylate (manufactured by NOF Corporation, BLEMMER SA), 13 parts by mass of toluene and 3 parts by mass of a photoinitiator (Ciba-Geigy Corp., Irgacure 184) were mixed into 74 parts by mass of the resulting urethane acrylate to prepare an active energy ray-curing composition.

Working Example 40

A laminated film and formed film were obtained in the same manner as Working example 39, except that raw material A4 was used. The obtained results are shown in Table 1. Excellent self-healing property was exhibited.

TABLE 1

| | | | Working example 1 | Working example 2 | Working example 3 | Working example 4 | Working example 5 | Working example 6 | Working example 7 | Working example 8 | Working example 9 |
|---|---|---|---|---|---|---|---|---|---|---|---|
| | Raw material for layer A | | A1 | A1 | A1 | A1 | A1 | A1 | A1 | A1 | A1 |
| | Additive | | 2-(perfluorohexyl) ethyl acrylate | | | 2-(perfluorobutyl) ethyl methacrylate | | | 2-(perfluorohexyl) ethyl methacrylate | | |
| | Amount added [parts by mass] | | 10 | | | 10 | | | 10 | | |
| | Oxygen concentration in energy ray irradiation step [vol %] | | 0.1 | | | 0.1 | | | 0.1 | | |
| Diluting solvent ratio | Methyl ethyl ketone | | 93 | | | 93 | | | 93 | | |
| | Cyclohexanone | | 7 | | | 7 | | | 7 | | |
| | Solid content [mass %] | | 30 | | | 30 | | | 30 | | |
| | Drying temperature [° C.] | | 100 | | | 100 | | | 100 | | |
| | Tg of layer A [° C.] | | 8.7 | 8.7 | 8.7 | 7.6 | 7.6 | 7.6 | 8.9 | 8.9 | 8.9 |
| Laminated Film | Contact angle [°] | Distilled water | 111 | 111 | 111 | 109 | 109 | 109 | 114 | 114 | 114 |
| | | Diiodomethane | 83 | 83 | 83 | 80 | 80 | 80 | 84 | 84 | 84 |
| | Soiling resistance (cosmetics) | | ○ | ○ | ○ | ○ | ○ | ○ | ○ | ○ | ○ |
| | Soiling resistance (PVC sheet) | | ○ | ○ | ○ | ○ | ○ | ○ | ○ | ○ | ○ |
| | Thickness of layer A [μm] | | 30 | 30 | 30 | 30 | 30 | 30 | 30 | 30 | 30 |
| | Number of layers in layer A | | 1 | 1 | 1 | 1 | 1 | 1 | 1 | 1 | 1 |
| | Average breaking elongation [%] | 80° C. | 72 | 72 | 72 | 73 | 73 | 73 | 70 | 70 | 70 |
| | | 150° C. | 70 | 70 | 70 | 70 | 70 | 70 | 68 | 68 | 68 |
| | Fluorine atom abundance in surface region of layer A [%] | | 17 | 17 | 17 | 14 | 14 | 14 | 18 | 18 | 18 |
| | Fluorine atom detection intensity ratio between surface region and interior region of layer A [%] | | 16 | 16 | 16 | 20 | 20 | 20 | 16 | 16 | 16 |
| | Self-healing property [seconds] | 5° C. | 16.6 | 16.6 | 16.6 | 16 | 16 | 16 | 21 | 21 | 21 |
| | | 10° C. | 8.9 | 8.9 | 8.9 | 8.2 | 8.2 | 8.2 | 9.6 | 9.6 | 9.6 |
| | | 20° C. | 0.1> | 0.1> | 0.1> | 0.1> | 0.1> | 0.1> | 0.1> | 0.1> | 0.1> |
| Formed film | Thickness of layer A [μm] | | 30 | 23 | 19 | 30 | 23 | 19 | 30 | 23 | 19 |
| | Self-healing property [seconds] | 5° C. | 16.6 | 20.1 | 24.5 | 16 | 20 | 23.3 | 17.8 | 23.3 | 26.3 |
| | | 10° C. | 8.9 | 11 | 12.3 | 8.2 | 10.1 | 12.1 | 10.1 | 14 | 12.3 |
| | | 20° C. | 0.1> | 0.1> | 0.1> | 0.1> | 0.1> | 0.1> | 0.1> | 0.1> | 0.1> |
| | Formability | | Good | Good | Good | Good | Good | Good | Good | Good | Good |
| | Forming ratio | | 1.00 | 1.30 | 1.58 | 1.00 | 1.30 | 1.58 | 1.00 | 1.30 | 1.58 |

TABLE 1-continued

|  |  | Working example 10 | Working example 11 | Working example 12 | Working example 13 | Working example 14 | Working example 15 | Working example 16 | Working example 17 | Working example 18 |
|---|---|---|---|---|---|---|---|---|---|---|
|  | Raw material for layer A | A1 | A1 | A1 | A1 | A1 | A1 | A1 | A1 | A1 |
|  | Additive | 2-(perfluorohexyl) ethanol | | | 2-(perfluorohexyl) ethyl acrylate | | | 2-(perfluorohexyl) ethyl acrylate | | |
|  | Amount added [parts by mass] | 10 | | | 3 | | | 20 | | |
|  | Oxygen concentration in energy ray irradiation step [vol %] | — | | | 0.1 | | | 0.1 | | |
| Diluting solvent ratio | Methyl ethyl ketone | 93 | | | 93 | | | 93 | | |
|  | Cyclohexanone | 7 | | | 7 | | | 7 | | |
|  | Solid content [mass %] | 30 | | | 30 | | | 30 | | |
|  | Drying temperature [° C.] | 160 | | | 100 | | | 100 | | |
|  | Tg of layer A [° C.] | 11.5 | 11.5 | 11.5 | 8.1 | 8.1 | 8.1 | 9.9 | 9.9 | 9.9 |
| Laminated Film | Contact angle [°] Distilled water | 100 | 100 | 100 | 109 | 109 | 109 | 114 | 114 | 114 |
|  | Diiodomethane | 74 | 74 | 74 | 80 | 80 | 80 | 86 | 86 | 86 |
|  | Soiling resistance (cosmetics) | ● | ● | ● | ○ | ○ | ○ | ○ | ○ | ○ |
|  | Soiling resistance (PVC sheet) | Δ | Δ | Δ | Δ | Δ | Δ | ○ | ○ | ○ |
|  | Thickness of layer A [μm] | 30 | 30 | 30 | 30 | 30 | 30 | 30 | 30 | 30 |
|  | Number of layers in layer A | 1 | 1 | 1 | 1 | 1 | 1 | 1 | 1 | 1 |
|  | Average breaking elongation [%] 80° C. | 68 | 68 | 68 | 72 | 72 | 72 | 69 | 69 | 69 |
|  | 150° C. | 66 | 66 | 66 | 70 | 70 | 70 | 69 | 69 | 69 |
|  | Fluorine atom abundance in surface region of layer A [%] | 0.5 | 0.5 | 0.5 | 14 | 14 | 14 | 21 | 21 | 21 |
|  | Fluorine atom detection intensity ratio between surface region and interior region of layer A [%] | 55 | 55 | 55 | 18 | 18 | 18 | 20 | 20 | 20 |
|  | Self-healing property [seconds] 5° C. | 18.9 | 18.9 | 18.9 | 10.1 | 10.1 | 10.1 | 29 | 29 | 29 |
|  | 10° C. | 9.7 | 9.7 | 9.7 | 5.4 | 5.4 | 5.4 | 12.6 | 12.6 | 12.6 |
|  | 20° C. | 0.1> | 0.1> | 0.1> | 0.1> | 0.1> | 0.1> | 5.6 | 5.6 | 5.6 |
| Formed film | Thickness of layer A [μm] | 30 | 23 | 19 | 30 | 23 | 19 | 30 | 23 | 19 |
|  | Self-healing property [seconds] 5° C. | 22.3 | 24.1 | 31.2 | 10.1 | 11.6 | 14.3 | 29 | 35.3 | 45.5 |
|  | 10° C. | 17.1 | 21.1 | 23.8 | 5.4 | 6.1 | 8.1 | 12.6 | 14 | 18.9 |
|  | 20° C. | 0.1> | 0.1> | 0.1> | 0.1> | 0.1> | 0.1> | 5.6 | 7.3 | 9.5 |
|  | Formability | Good | Good | Good | Good | Good | Good | Good | Good | Good |
|  | Forming ratio | 1.00 | 1.30 | 1.58 | 1.00 | 1.30 | 1.58 | 1.00 | 1.30 | 1.58 |

|  |  | Working example 19 | Working example 20 | Working example 21 | Working example 22 | Working example 23 | Working example 24 | Working example 25 | Working example 26 | Working example 27 |
|---|---|---|---|---|---|---|---|---|---|---|
|  | Raw material for layer A | A2 | A2 | A2 | A1 | A1 | A1 | A1 | A1 | A1 |
|  | Additive | 2-(perfluorohexyl) ethyl acrylate | | | | | 2-(perfluorohexyl) ethyl acrylate | | | |
|  | Amount added [parts by mass] | 10 | | | | | 10 | | | |
|  | Oxygen concentration in energy ray irradiation step | 0.1 | | | | | 0.1 | | | |
| Diluting solvent ratio | Methyl ethyl ketone | 93 | | | | | 93 | 93 | 93 | 100 |
|  | Cyclohexanone | 7 | | | | | 7 | 7 | 7 | 0 |
|  | Solid content [mass %] | 30 | | | | | 30 | 40 | 40 | 30 |
|  | Drying temperature [° C.] | 100 | | | | | 160 | 100 | 160 | 100 |
|  | Tg of layer A [° C.] | 14.1 | 14.1 | 14.1 | 8.7 | 8.7 | 8.7 | 8.7 | 8.7 | 8.7 |
| Laminated Film | Contact angle [°] Distilled water | 112 | 112 | 112 | 111 | 111 | 111 | 111 | 110 | 110 |
|  | Diiodomethane | 83 | 83 | 83 | 83 | 83 | 82 | 82 | 80 | 79 |
|  | Soiling resistance (cosmetics) | ○ | ○ | ○ | ○ | ○ | ○ | ○ | ○ | ● |
|  | Soiling resistance (PVC sheet) | ○ | ○ | ○ | ○ | ○ | ○ | ○ | Δ | Δ |
|  | Thickness of layer A [μm] | 30 | 30 | 30 | 30 | 30 | 30 | 30 | 30 | 30 |
|  | Number of layers in layer A | 1 | 1 | 1 | 1 | 1 | 1 | 1 | 1 | 1 |
|  | Average breaking elongation [%] 80° C. | 67 | 67 | 67 | 76 | 76 | 72 | 72 | 72 | 72 |
|  | 150° C. | 66 | 66 | 66 | 71 | 71 | 70 | 70 | 70 | 70 |
|  | Fluorine atom abundance in surface region of layer A [%] | 17 | 17 | 17 | 17 | 17 | 15 | 15 | 15 | 13 |
|  | Fluorine atom detection intensity ratio between surface region and interior region of layer A [%] | 15 | 15 | 15 | 16 | 16 | 16 | 18 | 20 | 24 |
|  | Self-healing property [seconds] 5° C. | 19.1 | 19.1 | 19.1 | 15.2 | 15.5 | 15.6 | 16.8 | 16.8 | 15.2 |
|  | 10° C. | 11.1 | 11.1 | 11.1 | 8.7 | 7.9 | 7.5 | 9.2 | 9.2 | 7.1 |
|  | 20° C. | 0.1> | 0.1> | 0.1> | 0.1> | 0.1> | 0.1> | 0.1> | 0.1> | 0.1> |
| Formed film | Thickness of layer A [μm] | 30 | 23 | 19 | 30 | 30 | 30 | 30 | 30 | 30 |
|  | Self-healing property [seconds] 5° C. | 19.1 | 19.4 | 25.1 | 15.2 | 15.5 | 15.6 | 16.8 | 16.8 | 15.2 |
|  | 10° C. | 11.1 | 11.9 | 19.2 | 8.7 | 7.9 | 7.5 | 9.2 | 9.2 | 7.1 |
|  | 20° C. | 0.1> | 0.1> | 0.1> | 0.1> | 0.1> | 0.1> | 0.1> | 0.1> | 0.1> |

TABLE 1-continued

|  |  |  |  |  |  |  |  |  |  |
|---|---|---|---|---|---|---|---|---|---|
| Formability | Good | Good | Good | Good | Good | Good | Good | Good | Good |
| Forming ratio | 1.00 | 1.30 | 1.58 | 1.00 | 1.00 | 1.00 | 1.00 | 1.00 | 1.00 |

|  |  | Working example 28 | Working example 29 | Working example 30 | Working example 31 | Working example 32 | Working example 33 | Working example 34 | Working example 35 |
|---|---|---|---|---|---|---|---|---|---|
|  | Raw material for layer A | A1 | A1 | A1 | A1 | A1 | A1 | A1 | A1 |
|  | Additive |  | 2-(perfluorohexyl) ethyl acrylate |  |  | 2-(perfluorohexyl) ethyl acrylate |  |  |  |
|  | Amount added [parts by mass] |  | 10 |  |  | 10 |  |  |  |
|  | Oxygen concentration in energy ray irradiation step [vol %] |  | 0.1 |  |  | 21 |  |  |  |
| Diluting solvent ratio | Methyl ethyl ketone | 100 | 100 | 100 | 93 | 93 | 93 | 93 | 100 |
|  | Cyclohexanone | 0 | 0 | 0 | 7 | 7 | 7 | 7 | 0 |
|  | Solid content [mass %] | 30 | 40 | 40 | 30 | 30 | 40 | 40 | 30 |
|  | Drying temperature [° C.] | 160 | 100 | 160 | 100 | 160 | 100 | 160 | 100 |
|  | Tg of layer A [° C.] | 8.7 | 8.7 | 8.7 | 8.7 | 8.7 | 8.7 | 8.7 | 8.7 |
| Laminated Film | Contact angle [°] Distilled water | 110 | 109 | 108 | 108 | 108 | 108 | 107 | 107 |
|  | Diiodomethane | 79 | 78 | 78 | 78 | 78 | 77 | 76 | 75 |
|  | Soiling resistance (cosmetics) | ● | ● | ● | ● | ● | ● | Δ | Δ |
|  | Soiling resistance (PVC sheet) | Δ | Δ | Δ | Δ | Δ | Δ | Δ | Δ |
|  | Thickness of layer A [μm] | 30 | 30 | 30 | 30 | 30 | 30 | 30 | 30 |
|  | Number of layers in layer A | 1 | 1 | 1 | 1 | 1 | 1 | 1 | 1 |
|  | Average breaking 80° C. | 72 | 72 | 72 | 70 | 70 | 70 | 70 | 70 |
|  | elongation [%] 150° C. | 70 | 70 | 70 | 68 | 68 | 68 | 68 | 68 |
|  | Fluorine atom abundance in surface region of layer A [%] | 13 | 12 | 11 | 11 | 11 | 10 | 10 | 9 |
|  | Fluorine atom detection intensity ratio between surface region and interior region of layer A [%] | 24 | 26 | 26 | 26 | 26 | 27 | 27 | 28 |
|  | Self-healing property 5° C. | 17.4 | 17.4 | 17.2 | 16.2 | 15.8 | 16.2 | 15.8 | 15.2 |
|  | [seconds] 10° C. | 9.6 | 9.6 | 9.4 | 7.7 | 7.5 | 7.7 | 7.5 | 6.8 |
|  | 20° C. | 0.1> | 0.1> | 0.1> | 0.1> | 0.1> | 0.1> | 0.1> | 0.1> |
| Formed film | Thickness of layer A [μm] | 30 | 30 | 30 | 30 | 30 | 30 | 30 | 30 |
|  | Self-healing property 5° C. | 17.4 | 17.4 | 17.2 | 16.2 | 15.8 | 16.2 | 15.8 | 15.2 |
|  | [seconds] 10° C. | 9.6 | 9.6 | 9.4 | 7.7 | 7.5 | 7.7 | 7.5 | 6.8 |
|  | 20° C. | 0.1> | 0.1> | 0.1> | 0.1> | 0.1> | 0.1> | 0.1> | 0.1> |
|  | Formability | Good | Good | Good | Good | Good | Good | Good | Good |
|  | Forming ratio | 1.00 | 1.00 | 1.00 | 1.00 | 1.00 | 1.00 | 1.00 | 1.00 |

|  |  | Working example 36 | Working example 37 | Working example 38 | Working example 39 | Working example 40 |
|---|---|---|---|---|---|---|
|  | Raw material for layer A | A1 | A1 | A1 | A3 | A4 |
|  | Additive |  | 2-(perfluorohexyl) ethyl acrylate |  |  |  |
|  | Amount added [parts by mass] |  | 10 |  |  |  |
|  | Oxygen concentration in energy ray irradiation step [vol %] |  | 21 |  | 0.1 | 0.1 |
| Diluting solvent ratio | Methyl ethyl ketone | 100 | 100 | 100 | 93 | 93 |
|  | Cyclohexanone | 0 | 0 | 0 | 7 | 7 |
|  | Solid content [mass %] | 30 | 40 | 40 | 30 | 30 |
|  | Drying temperature [° C.] | 160 | 100 | 160 | 100 | 100 |
|  | Tg of layer A [° C.] | 8.7 | 8.7 | 8.7 | 14 | 15 |
| Laminated Film | Contact angle [°] Distilled water | 107 | 107 | 107 | 110 | 107 |
|  | Diiodomethane | 74 | 75 | 74 | 79 | 75 |
|  | Soiling resistance (cosmetics) | Δ | Δ | Δ | ○ | ○ |
|  | Soiling resistance (PVC sheet) | Δ | Δ | Δ | Δ | Δ |
|  | Thickness of layer A [μm] | 30 | 30 | 30 | 30 | 30 |
|  | Number of layers in layer A | 1 | 1 | 1 | 1 | 1 |
|  | Average breaking 80° C. | 70 | 70 | 70 | 30 | 26 |
|  | elongation [%] 150° C. | 68 | 68 | 68 | 24 | 20 |
|  | Fluorine atom abundance in surface region of layer A [%] | 8 | 9 | 8 | 13 | 9 |
|  | Fluorine atom detection intensity ratio between surface region and interior region of layer A [%] | 28 | 28 | 28 | 26 | 31 |
|  | Self-healing property 5° C. | 15.6 | 15.2 | 15.2 | 23.4 | 41.2 |
|  | [seconds] 10° C. | 7.8 | 7.4 | 7.1 | 13.8 | 24.6 |
|  | 20° C. | 0.1> | 0.1> | 0.1> | 4.4 | 9.6 |
| Formed film | Thickness of layer A [μm] | 30 | 30 | 30 | 30 | 30 |
|  | Self-healing property 5° C. | 15.6 | 15.2 | 15.2 | 23.4 | 41.2 |
|  | [seconds] 10° C. | 7.8 | 7.4 | 7.1 | 13.8 | 24.6 |
|  | 20° C. | 0.1> | 0.1> | 0.1> | 4.4 | 9.6 |
|  | Formability | Good | Good | Good | Good | Good |
|  | Forming ratio | 1.00 | 1.00 | 1.00 | 1.00 | 1.00 |

Comparative Example 1

A 100 μm-thick polyester substrate film (manufactured by Toray Industries, Inc., "Lumirror" U46) was coated with raw material A1 using a wire bar to form layer A with a target post-aging step thickness of 30 μM. The film was heated at 160° C. for 2 minutes using a hot air dryer (heating step). Next, it was heated at 40° C. for 14 days (aging step) to obtain a laminated film. The resulting film was then formed. In this example, there was no stretching, with only preheating provided.

The obtained results for the resulting laminated film and formed film are shown in Table 2. Though excellent self-healing property was exhibited, soiling resistance was inadequate.

Comparative Examples 2 to 3

A laminated film and formed film were obtained in the same manner as Working example 1, except that the thickness of layer A and stretching ratios were changed. In comparative example 2, a stretching ratio in the vertical direction of 1.2 and a stretching ratio in the horizontal direction of 1.2 were used during forming, while the post-aging step thickness of layer A was set to 23 μm. In comparative example 3, a stretching ratio in the vertical direction of 1.3 and a stretching ratio in the horizontal direction of 1.3 were used during forming, while the post-aging step thickness of layer A was set to 19 μm. The obtained results are shown in Table 2. Excellent self-healing property was exhibited, even when layer A was made thin, and no forming defects were observed. However, soiling resistance was inadequate.

Comparative Example 4

A laminated film and formed film were obtained in the same manner as Working example 1, except that the amount of 2-(perfluoro hexyl)ethyl acrylate added was changed to 0.1 parts by mass. The obtained results are shown in Table 2. Though excellent self-healing property was exhibited, soiling resistance was inadequate.

Comparative Example 5

A laminated film and formed film were obtained in the same manner as Working example 1, except that the amount of 2-(perfluoro hexyl)ethyl acrylate added was changed to 30 parts by mass. The obtained results are shown in Table 2. Though self-healing property was inadequate, excellent soiling resistance was exhibited.

Comparative Example 6

A laminated film and formed film were obtained in the same manner as Working example 10, except that the amount of 2-(perfluoro hexyl)ethanol added was changed to 0.1 parts by mass. The obtained results are shown in Table 2. Though excellent self-healing property was exhibited, soiling resistance was inadequate.

Comparative Example 7

A laminated film and formed film were obtained in the same manner as Working example 10, except that the amount of 2-(perfluoro hexyl)ethanol added was changed to 30 parts by mass. The obtained results are shown in Table 2. Though self-healing property was inadequate, excellent soiling resistance was exhibited.

Comparative Example 8

A composition containing 5 parts by mass of 1-hydroxy-cyclohexyl-phenyl-ketone with regard to 100 parts by mass of 2-(perfluoro hexyl)ethyl acrylate was diluted using methyl ethyl ketone to prepare a coating liquid with a solid content of 40 mass %, and the laminated film obtained in Comparative example 1 was coated with this liquid using a wire bar to form layer A with a target post-energy ray irradiation step thickness of 1 μm. After coating, the film was heated at 80° C. for 2 minutes using a hot air dryer (heating step). Next, it was irradiated with ultraviolet light at an illuminance of 600 W/cm$^2$ and a cumulative light dose of 800 mJ/cm$^2$ under an oxygen concentration of 0.1 vol % using a 160 W/cm high-pressure mercury vapor lamp (manufactured by Eye Graphics Co., Ltd.) (energy ray irradiation step) to obtain a laminated film. The resulting film was then formed. In this example, there was no stretching, with only preheating provided.

The obtained results for the resulting laminated film and formed film are shown in Table 2. Though excellent soiling resistance was exhibited, self-healing property was not displayed.

Comparative Example 9

A laminated film and formed film were obtained in the same manner as Working example 1, except that 10 parts by mass of 2-(perfluoro hexyl)ethyl acrylate, instead of 10 parts by mass of hexafluoropropene trimer, was added. The obtained results are shown in Table 2. Though excellent self-healing property was exhibited, soiling resistance was inadequate.

TABLE 2

| | | | Comparative example 1 | Comparative example 2 | Comparative example 3 | Comparative example 4 | Comparative example 5 |
|---|---|---|---|---|---|---|---|
| | Raw material for layer A | | A1 | A1 | A1 | A1 | A1 |
| | Additive | | — | — | — | 2-(Perfluoro hexyl) ethyl acrylate | |
| | Amount added [parts by mass] | | — | — | — | 0.1 | 30 |
| | oxygen concentration in energy ray irradiation step [vol %] | | — | — | — | 0.1 | 0.1 |
| Diluting solvent ratio | Methyl ethyl ketone | | 100 | 100 | 100 | 93 | 93 |
| | Cyclohexanone | | 0 | 0 | 0 | 7 | 7 |
| | Solid content [mass %] | | 40 | 40 | 40 | 30 | 30 |
| | Drying temperature [° C.] | | 160 | 160 | 160 | 100 | 100 |
| | Tg of layer A [° C.] | | −12.5 | −12.5 | −12.5 | −5.2 | 19 |
| Laminated Film | Contact angle [°] | Distilled water | 106 | 106 | 106 | 109 | 115 |
| | | Diiodomethane | 64 | 64 | 64 | 69 | 88 |
| | Soiling resistance (cosmetics) | | X | X | X | X | ○ |

TABLE 2-continued

|  |  |  |  |  |  |  |
|---|---|---|---|---|---|---|
|  | Soiling resistance (PVC sheet) | X | X | X | X | ○ |
|  | Thickness of layer A [μm] | 30 | 30 | 30 | 30 | 30 |
|  | Number of layers in layer A | 1 | 1 | 1 | 1 | 1 |
|  | Average breaking 80° C. | 70 | 70 | 70 | 72 | 66 |
|  | elongation [%] 150° C. | 70 | 70 | 70 | 70 | 64 |
|  | Fluorine atom abundance in surface region of layer A [%] | — | — | — | 0.3 | 26 |
|  | Fluorine atom detection intensity ratio between surface region and interior region of layer A [%] | — | — | — | 22 | 65 |
|  | Self-healing property 5° C. | 5.6 | 5.6 | 5.6 | 7.9 | 122 |
|  | [seconds] 10° C. | 0.9 | 0.9 | 0.9 | 1.9 | 66.3 |
|  | 20° C. | 0.1> | 0.1> | 0.1> | 0.1> | 26 |
| Formed film | Thickness of layer A [μm] | 30 | 23 | 19 | 30 | 30 |
|  | Self-healing property 5° C. | 5.6 | 5.6 | 6.1 | 7.9 | 122 |
|  | [seconds] 10° C. | 0.9 | 1.3 | 1.6 | 1.9 | 66.3 |
|  | 20° C. | 0.1> | 0.1> | 0.1> | 0.1> | 26 |
|  | Formability | Good | Good | Good | Good | Good |
|  | Forming ratio | 1.00 | 1.30 | 1.58 | 1.00 | 1.00 |

|  |  |  | Comparative example 6 | Comparative example 7 | Comparative example 8 | Comparative example 9 |
|---|---|---|---|---|---|---|
|  | Raw material for layer A |  | A1 | A1 | — | A1 |
|  | Additive |  | 2-(Perfluoro hexyl) ethanol |  | — | Hexafluoropropene timer |
|  | Amount added [parts by mass] |  | 0.1 | 30 | — | 10 |
|  | oxygen concentration in energy ray irradiation step [vol %] |  | — | — | 0.1 | 0.1 |
| Diluting solvent ratio | Methyl ethyl ketone |  | 93 | 93 | 100 | 93 |
|  | Cyclohexanone |  | 7 | 7 | 0 | 7 |
|  | Solid content [mass %] |  | 30 | 30 | 40 | 30 |
|  | Drying temperature [° C.] |  | 160 | 160 | 80 | 100 |
|  | Tg of layer A [° C.] |  | 10.1 | 11.5 | 2.1 | 5.5 |
| Laminated Film | Contact angle [°] | Distilled water | 103 | 118 | 117 | 107 |
|  |  | Diiodomethane | 66 | 90 | 88 | 69 |
|  | Soiling resistance (cosmetics) |  | X | ○ | ○ | X |
|  | Soiling resistance (PVC sheet) |  | X | ○ | ○ | X |
|  | Thickness of layer A [μm] |  | 30 | 30 | 30 | 30 |
|  | Number of layers in layer A |  | 1 | 1 | 2 | 1 |
|  | Average breaking 80° C. |  | 70 | 68 | 70 | 70 |
|  | elongation [%] 150° C. |  | 71 | 66 | 70 | 70 |
|  | Fluorine atom abundance in surface region of layer A [%] |  | 0.2 | 28 | 32 | 0.2 |
|  | Fluorine atom detection intensity ratio between surface region and interior region of layer A [%] |  | 25 | 75 | 98 | 90 |
|  | Self-healing property 5° C. |  | 17.3 | 166 | — | 9.6 |
|  | [seconds] 10° C. |  | 11.6 | 89.9 | — | 6.2 |
|  | 20° C. |  | 0.1> | 33 | — | 0.1> |
| Formed film | Thickness of layer A [μm] |  | 30 | 30 | 30 | 30 |
|  | Self-healing property 5° C. |  | 17.3 | 166 | — | 9.6 |
|  | [seconds] 10° C. |  | 11.6 | 89.9 | — | 6.2 |
|  | 20° C. |  | 0.1> | 33 | — | 0.1> |
|  | Formability |  | Good | Good | Good | Good |
|  | Forming ratio |  | 1.00 | 1.00 | 1.00 | 1.00 |

INDUSTRIAL APPLICABILITY

The laminated film is suited to applications where formability and self-healing property are simultaneously required. It is particularly advantageously used as formed decorative films to be applied to chasses of personal computers, mobile phones, and the like.

The laminated film may be turned into formed products by applying various forming methods, such as injection molding, pneumatic forming, vacuum forming, thermal forming and press molding. The laminated film can accommodate deep-draw forming.

The invention claimed is:

1. A laminated film comprising a substrate film and layer A provided at least on one side thereof, layer A containing (1) a (poly)caprolactone segment, (2) a urethane bond, (3) at least one of a polysiloxane segment and a polydimethyl siloxane segment, and a fluorine compound, wherein a distilled water contact angle on layer A and a diiodomethane contact angle on layer A are 95° or more, but less than 120° and 70° or more, but less than 87°, respectively.

2. The laminated film as described in claim 1, wherein the diiodomethane contact angle on layer A is 80° or more but less than 87°.

3. The laminated film as described in claim 1, wherein fluorine atoms account for 0.4% to 50% of the total number (100%) of fluorine atoms, carbon atoms, nitrogen atoms, oxygen atoms, and silicon atoms as detected on a layer A-side surface of the laminated film via X-ray photoelectron spectroscopy.

4. The laminated film as described in claim 1 satisfying relationship a/b which is greater than 0% to 60%, wherein "a" is a maximum value of fluorine atom detection intensity measurements obtained by TOF-SIMS over a thickness range of 1% to 100% as measured from a layer A-side surface towards the substrate film as a proportion to the entire 100% thickness of the layer, and "b" is a maximum value of fluorine atom detection intensity measurements obtained by TOF-SIMS over a thickness range of 0% to 1%, exclusive, as measured from the layer A-side surface towards the substrate film.

5. The laminated film as described in claim 4, wherein proportion a/b is 5% to 20%.

6. The laminated film as described in claim 1, wherein Tg of layer A is $-30°$ C. to $15°$ C.

7. The laminated film as described in claim 1, wherein layer A is the only layer present at least on one side of the substrate film.

8. The laminated film as described in claim 1, wherein average breaking elongation of layer A at both $80°$ C. and $150°$ C. is 65% or more, but less than 100%.

9. The laminated film as described in claim 1, wherein the fluorine compound is specified below as a fluorine compound A-derived component, fluorine compound A referring to a compound as represented by formula (1):

$$B-R^1-R^f \quad (1)$$

wherein B, $R^1$ and $R^f$, respectively, indicate a reactive site or hydroxyl group, an alkylene group with a carbon number of 1 to 3 or an ester structure derived there from, and a fluoroalkyl group, and have no or more side chains in the structures thereof.

10. The laminated film as described in claim 9, wherein a fluorine compound A-derived component is contained in layer A and accounts for 0.5 to 25 mass % of the total mass (100 mass %) of all components of layer A.

11. A touch panel comprising the laminated film as described in claim 1.

12. A formed product comprising the laminated film as described in claim 1.

* * * * *